US009744490B1

(12) United States Patent
Novosselov et al.

(10) Patent No.: US 9,744,490 B1
(45) Date of Patent: Aug. 29, 2017

(54) TRAPPED VORTEX PARTICLE-TO-VAPOR CONVERTER

(71) Applicants: Igor Novosselov, Seattle, WA (US); Peter Ariessohn, Lake Tapps, WA (US)

(72) Inventors: Igor Novosselov, Seattle, WA (US); Peter Ariessohn, Lake Tapps, WA (US)

(73) Assignee: Enertechnix, Inc., Maple Valley, WA (US)

( * ) Notice: Subject to any disclaimer, the term of this patent is extended or adjusted under 35 U.S.C. 154(b) by 816 days.

(21) Appl. No.: 13/986,145

(22) Filed: Apr. 5, 2013

Related U.S. Application Data

(60) Provisional application No. 61/621,220, filed on Apr. 6, 2012.

(51) Int. Cl.

| | |
|---|---|
| ***B01D 49/00*** | (2006.01) |
| ***B01D 45/16*** | (2006.01) |
| ***B01D 45/08*** | (2006.01) |
| ***B01D 45/12*** | (2006.01) |
| ***B01D 50/00*** | (2006.01) |

(52) U.S. Cl.
CPC ............ *B01D 45/16* (2013.01); *B01D 45/08* (2013.01); *B01D 45/12* (2013.01); *B01D 50/002* (2013.01)

(58) Field of Classification Search
CPC ................ G01N 21/65; G01N 21/658; G01N 2201/06113; G01N 21/55; G01J 3/44; B01D 45/08; B01D 45/12; B01D 45/16; B01D 50/002; C04B 41/009; C04B 38/0006; F01M 13/04; F01M 13/0433
See application file for complete search history.

(56) References Cited

U.S. PATENT DOCUMENTS 1,600,762 A * 9/1926 Hawley ..................... B04C 1/00 110/119
2,290,664 A * 7/1942 Allardice .................. B04C 1/00 55/338
3,267,650 A * 8/1966 Lundin ..................... A47L 9/19 15/339
4,321,822 A * 3/1982 Marple ................ G01N 1/2208 73/28.06

(Continued)

FOREIGN PATENT DOCUMENTS

IT WO 2007093123 A1 * 8/2007 ............ B01D 45/16

*Primary Examiner* — Dung H Bui
(74) *Attorney, Agent, or Firm* — J. Michael Neary

(57) ABSTRACT

Apparatus and methods for selectively separating a volatile constituent of a particle from a gas stream for analysis. Particles are separated from bulk flow by inertia and impacted in a cavity containing a small but stable vortex or eddy. Heat is applied to volatilize constituents of the particles. The gas entrained within the vortex, which exchanges only slowly with the bulk flow, is withdrawn for analysis. In this way, a high volume flow containing particles of interest is reduced to a low volume flow containing a vapor concentrate. Advantageously, the apparatus may be operated at very low pressure drops in fully continuous, semi-continuous or batch mode according to the requirements of the downstream analytical unit. The apparatus finds use in active surveillance, such as in use of aerosols to detect explosives or chemical residues on persons, vehicles or luggage in real time.

20 Claims, 15 Drawing Sheets

(56) References Cited

U.S. PATENT DOCUMENTS

| | | | | | |
|---|---|---|---|---|---|
| 4,452,068 | A * | 6/1984 | Loo | G01N 1/2208 | |
| | | | | 73/28.05 | |
| 4,487,746 | A * | 12/1984 | Tahiliani | B01D 53/68 | |
| | | | | 261/119.1 | |
| 5,411,150 | A * | 5/1995 | Sigurdsson | A47L 9/0072 | |
| | | | | 15/339 | |
| 5,603,983 | A * | 2/1997 | Clough | C04B 35/62847 | |
| | | | | 427/126.3 | |
| 6,080,228 | A * | 6/2000 | Okada | B01D 46/0012 | |
| | | | | 55/396 | |
| 6,373,575 | B1 * | 4/2002 | Takayama | G01N 33/34 | |
| | | | | 355/30 | |
| 6,896,720 | B1 * | 5/2005 | Arnold | A47L 9/1608 | |
| | | | | 55/394 | |
| 7,799,567 | B1 * | 9/2010 | Call | B07B 7/00 | |
| | | | | 436/174 | |
| 8,342,641 | B2 * | 1/2013 | Pons | B41J 2/18 | |
| | | | | 347/36 | |
| 8,357,232 | B1 * | 1/2013 | Morrison | B01D 53/24 | |
| | | | | 55/404 | |
| 8,470,062 | B2 * | 6/2013 | Herman | F16L 55/24 | |
| | | | | 55/420 | |
| 8,480,777 | B2 * | 7/2013 | Sakaguchi | F01M 13/0416 | |
| | | | | 123/198 E | |
| 8,491,707 | B2 * | 7/2013 | Knuth | F15B 1/26 | |
| | | | | 137/1 | |
| 2004/0232052 | A1 * | 11/2004 | Call | B01D 21/2455 | |
| | | | | 209/143 | |
| 2009/0223279 | A1 * | 9/2009 | McFarland | B01D 46/06 | |
| | | | | 73/28.05 | |
| 2011/0034908 | A1 * | 2/2011 | Hyde | A61M 5/14276 | |
| | | | | 604/891.1 | |

* cited by examiner

AEROSOL
INTAKE PORT
INLET FLOW DUCT

100
BACK FACING STEP
TRAPPED VORTEX CAVITY
INERTIAL IMPACTOR FACE
TRAPPED VORTEX
SAMPLING PORT
FORWARD FACING STEP
VAPOR CONCENTRATE
LIP
HEATING ELEMENT
OUTLET FLOW DUCT
EXHAUST PORT

200

- AEROSOL
- INTAKE PORT
- INLET FLOW DUCT
- THERMALLY CONDUCTIVE WALL
- SAMPLING DUCT
- INERTIAL IMPACTOR FACE
- HEATING ELEMENT
- OUTLET FLOW DUCT
- EXHAUST PORT

```
DIRECTIONAL
SAMPLING NOSE
WITH PULSED JET
        │
        ▼
     AEROSOL
        │
        ▼
     INTAKE ──── 601
        │
        ▼
   AIR-TO-AIR ────► PARTICLE
   CONCENTRATOR     DEPLETE
        │            FLOW
        ▼
   PARTICLE RICH
   MINOR FLOW
        │
        ▼
LOW VOLUME      TRAPPED VORTEX
MAKE-UP GAS ──► HOT IMPACTOR ──── 602
FLOW SOURCE
        ┌────────┴────────┐
        ▼                 ▼
    FIRST            SECOND
  PUMP/BLOWER      PUMP/BLOWER
        │           604  │  603
        ▼                 ▼
    BULK EXHAUST    VAPOR ANALYSIS
```

AEROSOL CONCENTRATE

INTAKE PORT

INLET FLOW DUCT

700

THREE PARTICLE TRACKS

SAMPLING PORT

IMPACTOR FRONT-FACING STEP

TRAPPED VORTEX

VAPOR CONCENTRATE

DIVERTER LIP

HEATED WALL

OUTLET FLOW DUCT

EXHAUST PORT

PARTICLE-DEPLETED GAS FLOW

(~30 °C ISOTHERMS)

(~10 °C ISOTHERMS)

AEROSOL
↓
- PARTICLE UPTAKE — 1501
↓
- PARTICLE IMPACTION — 1502
↓
- VAPORIZATION IN TRAPPED VORTEX CAVITY — 1503
↓
- VAPOR CONCENTRATE, ANALYSIS AND DISPLAY — 1504

TRAPPED VORTEX PARTICLE-TO-VAPOR CONVERTER

This application relates to U.S. Provisional Application Ser. No. 61/621,220 filed 6 Apr. 2012 and entitled "Trapped Vortex Solid-to-Vapor Concentrator"

FIELD OF THE INVENTION

This invention is related to particle analysis apparatus and methods, where a trapped vortex cavity operatively conjoined to a gas flow channel, the trapped vortex cavity having an inertial impactor surface impinging on the gas flow. The trapped vortex cavity is heated so that particles entering the trapped vortex by inertia are stripped of volatiles. A vapor concentrate is withdrawn from the cavity for analysis of particle-associated volatile constituents.

BACKGROUND

There is a need for inspection and sampling of persons, articles of clothing, buildings, furnishings, vehicles, baggage, cargo containers, dumpsters, packages, mail, and the like for contaminating residues (termed here more generally "trace analytes" or "target analytes") that may indicate chemical hazards, explosives hazards, or illicit substances, while not limited thereto. Potential applications involve detection of trace materials, as both particles and vapors, associated with the presence of explosives on articles, on vehicles, or on persons, for example.

In particular, the recent increased threat to society from explosive devices and illicit drug traffic has lead to the development of sensitive systems for the detection of vapors and particles from explosives and drugs. Examples of prior art are described in U.S. Pat. Nos. 5,491,337, 6,708,572 and 6,642,513, among many. Equipment is available for hand search, desktop operation and walkthrough portal security applications, as has been reviewed by Hannum and Parmeter (Survey of commercially available explosives detection technologies and equipment, 1998, Sandia Natl Labs).

Current methods for surface sampling often involve contacting use of swabs or liquids, but methods for sampling by "sniffing" are preferred, where air in contact with a suspect package or person is drawn into a detection system directly. One prior art system, as described in U.S. Pat. No. 5,491,337, detects target analytes by ion mobility spectroscopy. Detectors of this class cannot tolerate humid air. Consequently, a dimethyl silicone membrane is used to reduce uptake of water vapor into the detector, while allowing the passage of at least a portion of the target analyte. Unfortunately the silicone membrane allows only a small part of the analyte vapors into the detector. Furthermore, the sensor does not capture particles, which can pass through the system without being detected.

McGown in U.S. Pat. No. 4,909,090 describes a hand-held vapor sampler, optionally with a shroud for enclosing a sampling space. The sampler uses low pressure puffs of hot air to vaporize illicit substances on surfaces and trap any vapors on a collector coil. The coil contains ribbon-like windings of metal which have a thin coating of material such as an organic polymer effective in absorbing organic molecules. However, particles are not sampled and would not be successfully aspirated under the conditions described, which relies on a 250 Watt lamp and a spring-actuated plunger for generating a puff of air. Improvements to the collector/desorber device are disclosed in U.S. Pat. No. 5,123,274 to Carroll.

U.S. Pat. No. 4,092,218 to Fine also discloses a method for the selective detection of explosives vapors, but does not show that it is capable of sampling particles. While it is tempting to limit collection to vapors alone, it is known that vapors of interest are frequently associated with or released from particles on heating, thus systems that collect only vapors may miss critical evidence.

Ishikawa in U.S. Pat. No. 7,275,453 discloses a cover enclosure in contact with a target surface, the enclosure with internally directed jet for operatively flushing and ejecting particles from the surface. Fine particles are collected by means of an inertial impactor and, at intervals, thermally flash gasified from the impactor for detection of chemical constituents by mass spectroscopy. A pair of impactors is used in parallel to increase sample throughput and to supply an uninterrupted gas feed to the mass spectrometer, however the sampling process remains a batch process. Also described is a heatable rotary trap, such as has long been known in the art.

To inspect mail or luggage, the sampling method of U.S. Pat. No. 6,887,710 involves first placing the article or articles in a box-like enclosure equipped with airlocks, directing a blast of air onto the exposed surfaces in order to dislodge particles associated with the articles, then sampling the gaseous contents of the box by drawing any resulting aerosol through a sampling port. However, the process is inherently slow because each article or person must be moved into the box or chamber and the box sealed before sampling, an obvious disadvantage when large numbers of articles or persons must be screened, or when the articles are larger than can be reasonably enclosed, such as a truck, shipping container, or the hallway surfaces of a building. Similar comments may be made regarding the teachings of U.S. Pat. No. 6,324,927 to Omath, where an enclosed shaker is used to dislodge particles.

Jenkins in U.S. Pat. No. 7,942,033 describes a method for sampling luggage by heating the luggage on a moving roller track and collecting vapors in the warm air plume rising from the hot luggage, optionally with vibration. In another embodiment, a stream of sampled air is impacted onto a porous filter, such that particles and "heavy molecules" are drawn into the filter by inertia, along with a flow of dry air, such that vapors pass through the filter for analysis, generally at elevated temperature. Unfortunately, continuous operation tends to clog the filter and reduces the filter temperature. Low filter temperature causes poor transmission of analyte, thus the apparatus is preferably operated in semi-continuous or batch mode. It is taught that vapor sampling is preferred over particle sampling because vapor is more closely associated with contraband.

Another approach, for sampling persons, is seen in U.S. Pat. No. 6,073,499 to Settles, aspects of which are also discussed in "Sniffers: fluid dynamic sampling for olfactory trace detection in nature and homeland security", J Fluids Eng 127:189-218.

Various particle and vapor traps are disclosed in patents to Linker of Sandia Labs. The patents to Linker disclose methods to collect explosives particles for trace detectors that have some capability to collect vapor as well. U.S. Pat. No. 6,345,545, for example, discloses a two-stage preconcentrator that uses a metal or other electrically conducting screen to capture particles. Some vapors may also stick to the screen, however, the surface chosen for particle collection is not in general optimal for vapor collection. U.S. Pat. No. 6,523,393 discloses a hand-portable embodiment of the metal screen particle concentrator that makes use of a removable screen that is manually placed first in the high volume flow region and second in the detector region. Also to Linker are U.S. Pat. Nos. 7,299,711, 6,978,657, 6,604, 406, 6,085,601, 5,854,431, and RE38,797.

Corrigan in U.S. Pat. Nos. 5,465,607 and 4,987,767, and Syage in U.S. Pat. No. 7,299,710, disclose systems for collection of particles and vapors. These systems operate in batch mode, resulting in interruption of sampling during processing Implementation has further proved difficult because particles have been found to poison commonly used vapor trap materials and means for efficiently separating particles from vapors are not recognized.

Also an unsolved problem is the elimination of vapor and gaseous interferences, such as water vapor, exogenous nitrous oxides, vehicle exhausts, sulfates, solvent vapors, and so forth, which are present in air and are known to interfere with or complicate a variety of analytical protocols. Thus direct collection of vapors is associated with both interferences and with loss of the particle signal, whereas combined collection can poison the vapor adsorbate. This dilemma is discussed in U.S. patent Ser. Nos. 13/078,997 and 13/078,999, which are co-assigned and are incorporated herein in entirety for all purposes by reference.

Thus, there is a need in the arts associated with aerosol surveillance and analysis for an apparatus and methods that overcome the above disadvantages and limitations. Of potential interest in high-throughput screening luggage, vehicles and persons is a system capable of continuous sampling at high flow rate, typically at a flow rate greater than 100 L/min, where particles are separated from interfering gases, and then the volatile constituents associated with the particles are vaporized and sampled at low flow rate, typically at or less than 1 L/min, most preferably at 50 to 150 milliliters per minute, or less. A preferred system requires little maintenance and operates with a relative absence of moving parts such that the gas phase is the vehicle for both selectively separating the particles from the bulk flow and for conveying vapors selectively stripped from the particles to an analytical unit.

SUMMARY

The invention relates to sampling and concentrative apparatus and to methods for analysis of trace analytes from surfaces and substrates where the trace analyte is in the form of a particulate composed of a volatile constituent, a particulate combined with a vapor, or a free vapor, and particularly to such apparatus and methods as are useful in surveillance for trace explosives residues, although not limited thereto.

Vapor concentration is effected by selectively transitioning particles out of a flowing gas stream and into a resident volume of a trapped vortex cavity. Heat is used to vaporize the volatile constituents trapped in the vortex flow and the vapor concentrate is withdrawn at a low flow rate for analysis. This solves a major problem of trace vapor analysis, the flow mismatch between the large or very large bulk flow throughput of the apparatus versus the need for a fractionally smaller flow rate to the analytical unit and also avoids the use of filters or obstructive extraction cartridges in line with the bulk flow.

Particles are separated from bulk flow by inertia and impacted in a cavity containing a small but stable vortex or eddy. Heat is applied to volatilize constituents of the particles. The gas and vapor concentrate entrained within the vortex, which exchanges only very slowly with the bulk flow, is withdrawn for analysis. In this way, a high volume flow containing particles of interest is reduced to a low volume flow containing a vapor concentrate. The trapped vortex behaves like a selectively permeable envelope around a resident gas volume entrained in the eddy. Particles may enter but the vapor concentrate in the vortex is effectively trapped therein.

Surprisingly, the trapped vortex vapor concentrator apparatus may be operated at very low pressure drops in fully continuous operation coupled to continuous downstream analysis with real time alarm capability that can be essentially instantaneous, as is urgently needed to handle high throughput sampling applications, using broad spectrum analytical means such as mass spectroscopy, the gold standard for confirmatory identification.

The apparatus finds use in active surveillance, such as in use of aerosols to detect explosives or chemical residues on persons, vehicles or luggage. Semi-continuous or batch mode operation may also be flexibly accommodated according to the requirements of the downstream analytical unit and the needed lower limit of detection.

In a preferred embodiment, we have surprisingly found that ultrasonic cleaning of the vapor trap can be performed while continuously sampling. Thus any ash, mineral or fiber is effectively jettisoned to exhaust without interfering with the ongoing vapor concentration process.

In a second preferred embodiment, we have surprisingly found that a carrier gas injected at a make-up volume in proportion to the low gas flow withdrawn for analysis results in a trapped vortex having a reduced concentration of gases associated with the bulk flow. Advantageously, the gases excluded include common interferents to analysis, such as water vapor and environmental nitrates that are the source of false positives and detector failure.

Particle laden flow is directed over a forward-facing step with diverter lip the forms the base of a trapped vortex cavity. The forward-facing step acts as an inertial impactor for particles and the diverter lip directs particle depleted streamlines to waste. Upon impact the particles are heated to release volatile constituents and the off-gassed vapors are withdrawn through a port located in the interior of the cavity. Due to the exceptional stability of the vortex the gaseous compounds inside the cavity do not escape from the enclosure, enabling the apparatus to deliver a highly concentrated vapor sample to a detector at a low sample flow rate. This particle capture and desorption method addresses flow mismatch between sampling and desorption flow and can be readily adjusted for different detector flow rates.

Several advantages are realized by embodiments of these inventive teachings.

The inlet flow duct and trapped vortex apparatus has very little flow resistance, as compared to a filter element or SPME bed, resulting in a small or negligible pressure drop, and thus can be conveniently operated at the high throughput flow rates needed to sample at an inspection station such as a whole body portal or a luggage conveyor belt, for example with minimal power requirements.

While permitting high intake flow velocities, the apparatus solves a significant issue: the flow mismatch in volumetric flow rate between the intake stream of ambient gas and the need for a sampling flow rate to an analytical module that is two or more orders of magnitude smaller (without loss of target analyte).

The backward facing step of the cavity induces flow separation around the diverter lip and a formation of a strongly isolated recirculation zone (trapped vortex) in the trap cavity. The vortex is very stable, i.e., the cavity does not allow significant vortex shedding, trapping most of the material (and heat) inside the cavity.

Surprisingly, there is an insignificant retrograde leakage of vortex contents into the bulk flow, ensuring that target analyte is not lost. This in part is related to the formation of a boundary layer between the trapped vortex and the inlet gas stream, but also arises from the steady mass flow out of the vortex cavity as needed for sampling. Heat does not escape the trap for the same reason, minimizing the overall energy requirements of the system.

The device may be operated continuously or semi-continuously, unlike other impactors or other collection media (filters, adsorbent substrates, etc) which must be periodically regenerated during use. Volatiles may be supplied to analysis by continuous in-line volatilization, unlike prior art applications having intermittent flash vaporization or off-line vaporization of replaceable cartridges or pledgets.

Vapor constituents aspirated from the trapped vortex are particle free, relieving the disadvantageous poisoning of downstream vapor adsorbate beds as is known to occur where particles and vapors are collected in tandem. This is an unexpected solution to a well-known problem.

Most surprisingly, vapor constituents aspirated from the trapped vortex may be conveyed to the analytical unit in a carrier gas that is depleted of any moisture and extraneous organic vapors that are present in the inlet airstream. Carrier gas may be injected into the trapped vortex cavity in proportion to the sampling flow rate out, thus ensuring that particles entering the vortex cavity through the boundary layer are stripped of ambient air and contaminants before being vaporized for analysis in an inert carrier gas such as helium, nitrogen or argon.

These embodiments of the invention are fully compatible with use of upstream air-to-air concentrator to achieve an excess of $10^{12}$-fold combined concentration by mass. A single particle having a mass of 10 femtograms in a gas volume of 10,000 Liters can result in a positive alarm from a suitable analytic unit operatively coupled to the sampling stream from a trapped vortex vapor concentrator of the invention.

The foregoing and other objectives, features, and advantages of the invention will be more readily understood upon consideration of the following detailed description of the invention, taken in conjunction with the accompanying drawings, in which preferred embodiments of the invention are illustrated by way of example. It is to be expressly understood, however, that the drawings are for illustration and description only and are not intended as a definition of the limits of the invention. The various features of novelty that characterize the invention are pointed out with particularity in the claims annexed to and forming part of this disclosure. The invention does not necessarily reside in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The teachings of the present invention are more readily understood by considering the drawings, in which:

FIG. 11A shows temperature steps of about 30° C.; FIG. 11B shows temperature steps of about 10° C.

Figure 1:
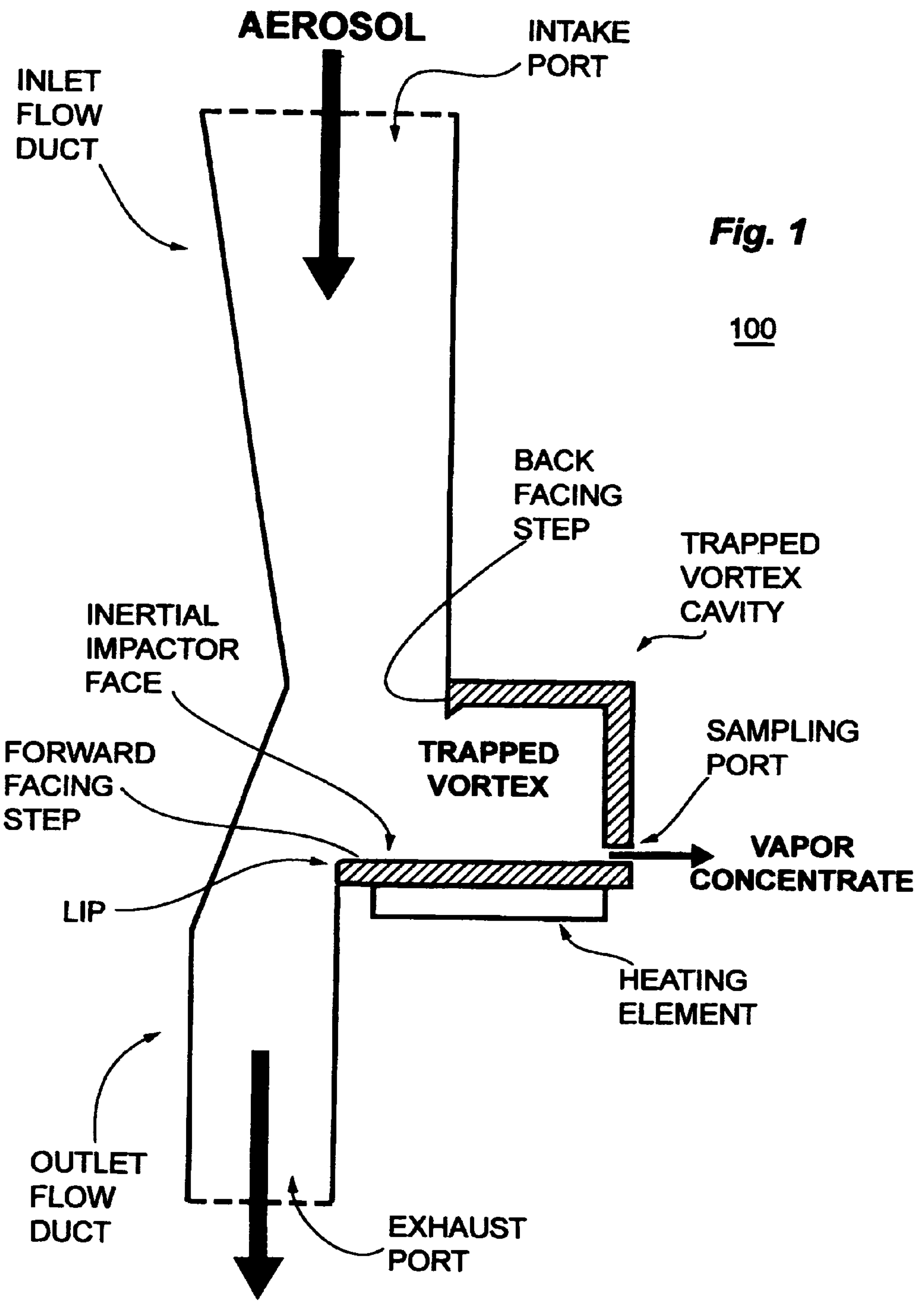
FIG. 1 is a schematic view of a first embodiment of an aerosol impactor with trapped vortex solid-to-vapor concentrator.

The drawing figures are not necessarily to scale. Certain features or components herein may be shown in somewhat schematic form and some details of conventional elements may not be shown in the interest of clarity and conciseness. The drawing figures are hereby made part of the specification, written description and teachings disclosed herein.

DETAILED DESCRIPTION

Referring to the figures, wherein like reference numerals refer to like components in the various views, there is illustrated a trapped vortex apparatus for vapor concentration and sampling, wherein selected embodiments are generally denominated 100, 200, 700, 1300 or 1400 herein.

An effective screening system for threat compounds such as explosives (as well as chemical hazards and illicit substances) must be able to collect, concentrate, and analyze trace samples quickly and accurately. Analysis is improved by selectively separating particles from a carrier gas stream in a trapped vortex or on an impactor surface within a trapped vortex cavity, and then heating the particles to strip off any volatile constituents for analysis in a small resident volume of gas trapped in a stable cyclonic eddy or vortex.

FIG. 1 is a schematic view of a first embodiment 100 of an aerosol impactor with trapped vortex solid-to-vapor concentrator.

An intake port forms the mouth of an inlet flow duct and is joined to an outlet flow duct with exhaust port such that bulk flow entering the intake port transits the apparatus and exits at the bottom as an exhaust stream. While depicted schematically, an enclosing wall surrounds the inlet and outlet ductworks.

Positioned between the inlet and outlet ducts is a trapped vortex cavity communicating with and adjoining said inlet flow duct. The trapped vortex cavity is bounded by superior, lateral, inferior, posterior, and anterior internal surfaces or walls, the anterior face defining an opening to the inlet flow duct through the enclosing wall.

The inferior surface of the trapped vortex cavity defines a forward-facing step with diverter lip that extends into and impinges on said inlet flow duct, partially constricting the gas stream and thereby defining an inertial particle impactor face for impactingly receiving any particles from the bulk flow. Particles with sufficient inertia to strike the impactor face do not follow the gas streamlines which flow around the diverter lip and into the outlet duct.

While shown in an upright position, the apparatus is commonly operated such that the trapped vortex cavity is pendant from the ductwork making up the main flow channel. In this way, gravitational settling of particles in the gas stream favors deposition in the trapped vortex. Insofar as gravitational settling of larger particles in an airstream (defined her as of 20 to 100 microns in aerodynamic diameter) can result in loss of critical evidence of an illicit substance, velocities in the airstream are preferably such that particles up to 100 microns are readily entrained in the flow without major settling losses.

Flow through the apparatus is driven by a pressure differential applied across the inlet and outlet ducts. Flow may be driven by a suction pump or more commonly by a blower operatively coupled to the exhaust port.

Instantaneous sampling rates during operation of 10 to 600 to 10,000 L/min or more are anticipated. Hand operated devices are expected to operate at 1-2 L/puff, but these devices are necessarily much smaller and more compact. In stationary applications, sustained throughputs of up to 10,000 L/min or more may be required. Happily, the pressure drop in the main flow channel is very small to negligible.

Heat is supplied to selectively heat the walls of the trapped vortex cavity, shown here with hatching to indicate a thermally conductive cross-section. Heat may be supplied for example from a heating element mounted under the impactor face, or by other means as will be described in other embodiments.

Also shown is a sampling port for withdrawing the vapor concentrate from the trapped vortex. The sampling port is supplied with a low flow rate suction device for aspirating a fractional volume of the trapped vortex eddy per unit time. Reduced sampling flow rates eliminate flow mismatch between aerosol collection rates and volumetric vapor analysis capacity that has been a well known problem in implementing analytical methods with high throughput front end sampling. Typically a downstream ion mobility spectrometer would have a flow rate of on the order of 1 L/min or less. Mass spectrometers typically are saturated at 50 to 150 mL/min or less, and the prior art solution has been to simply vent the unused part of the sample stream despite the resulting loss in detection sensitivity. The solution provided by the present invention is a technical advance in the art.

Figure 10:
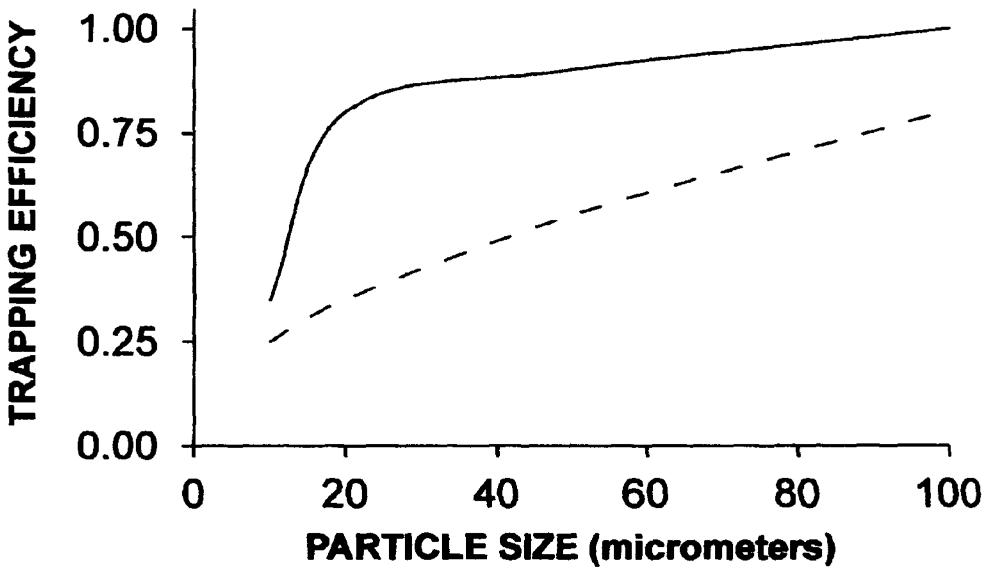
FIG. 10 compares the particle collection efficiency of the impactors of FIG. 1 versus FIG. 2 as a function of particle size.

Residence time in the vortex can be varied by adjusting the sample aspiration rate. Because of the remarkable stability of the trapped vortex in a suitably dimensioned cavity, losses of target analyte back to the bulk flow exhaust are not a significant hurdle to implementation. Particle losses, which are dependent on the cut size of the impactor ($D_{50}$) can be controlled by design of the inlet and outlet ductwork and the shape of the trapped vortex, particularly as it relates to the back-facing step where there is laminar flow separation between the slower velocity of the vortex and the higher velocity streamlines of the bulk flow, and also around the front-facing step where there is particle impaction. The effects of these contours are illustrated in FIG. 10 as will be described below.

Figure 2:
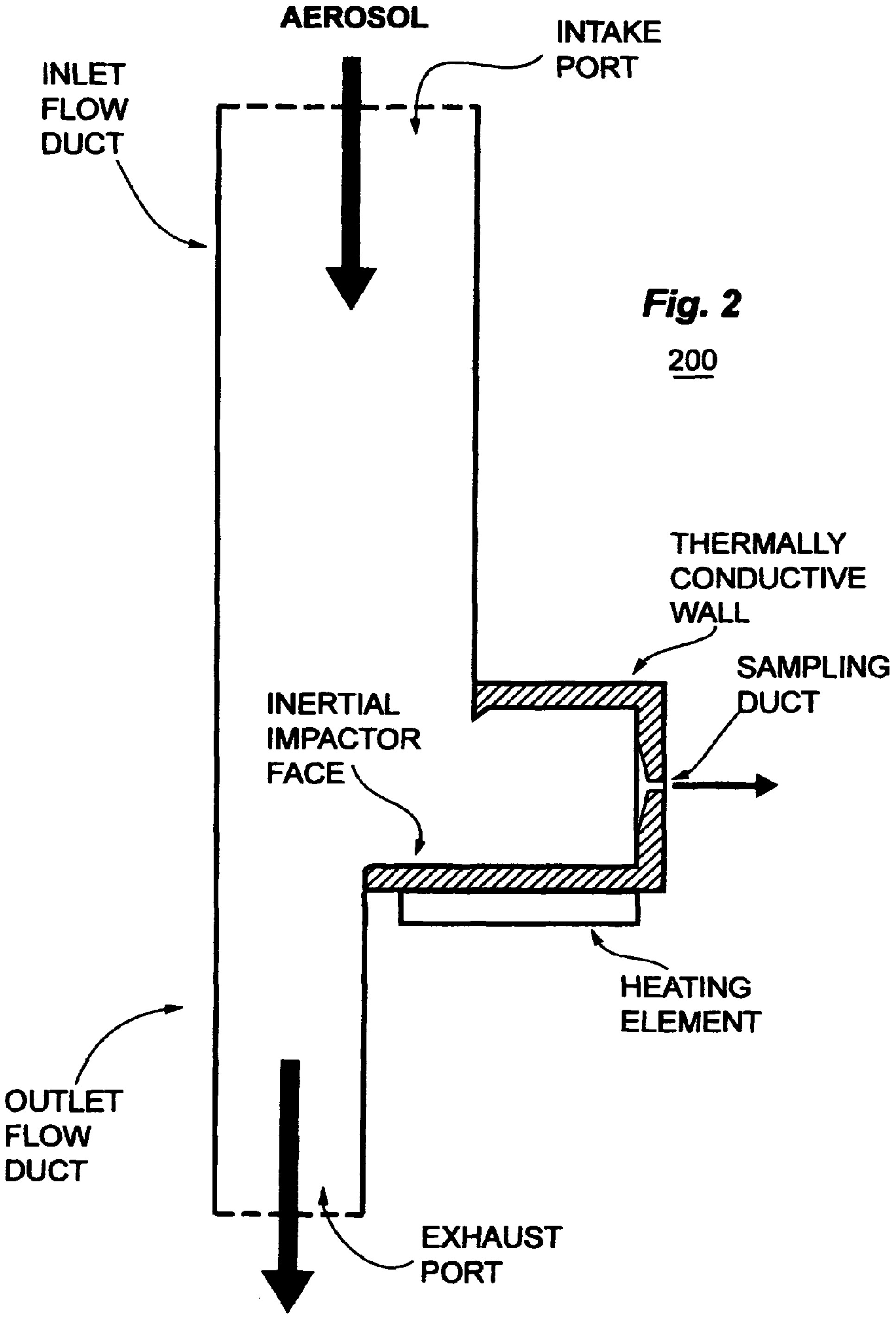
FIG. 2 is a schematic view of a second embodiment of an aerosol impactor with trapped vortex solid-to-vapor concentrator.

FIG. 2 is a schematic view of a second embodiment 200 of an aerosol impactor with trapped vortex solid-to-vapor concentrator and shows another configuration of the inlet and outlet flow ducts. In this embodiment, the walls of the ductwork are parallel to each other and lack the anisometric directional constriction of the embodiment 100 depicted in FIG. 1.

As before, a gas stream enters through an inlet mouth at the top of the apparatus, flows through inlet ductwork and encounters the laterally disposed trapped vortex cavity at the junction between the inlet flow duct and the outlet flow duct. An aerosol entering the inlet is directed so that a fraction of the particle contents are impacted on an inertial impactor face that forms the base of a hot wall trapped vortex cavity. A sampling port at the back of the cavity serves to convey any vapor concentrate released into the cavity to an analytical unit for detection of target analytes.

In a fully integrated sampling apparatus, an air-to-air concentrator may be fluidly mounted on top of the intake port, thus ensuring that a particle concentrate is delivered to the trapped vortex vapor concentrator. The particle beam or ribbon may be steered toward the trap by electrostatic repulsion if desired, and methods for ultrasonically directing particle flow are also known in the art.

Figure 3:
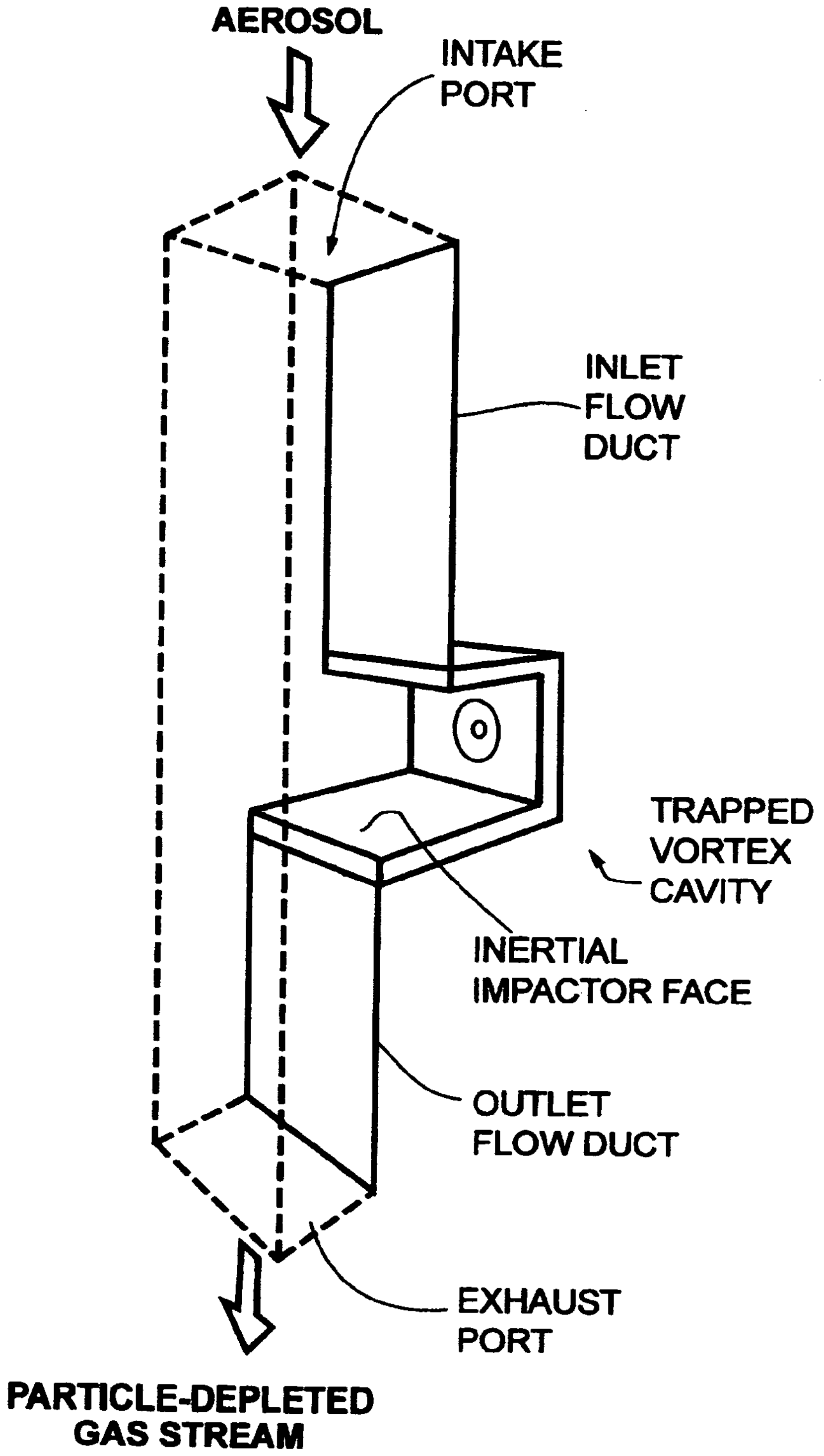
FIG. 3 is a perspective view of the concentrator of FIG. 2.

FIG. 3 is a perspective view of the concentrator of FIG. 2. The view emphasizes the way in which the trapped vortex cavity inserts into the main flow channel. Shown are the intake port with inlet ductwork, the exhaust port with outlet ductwork and the particle inertial impactor forward-facing step at the junction between the two duct sections.

Figure 4A:
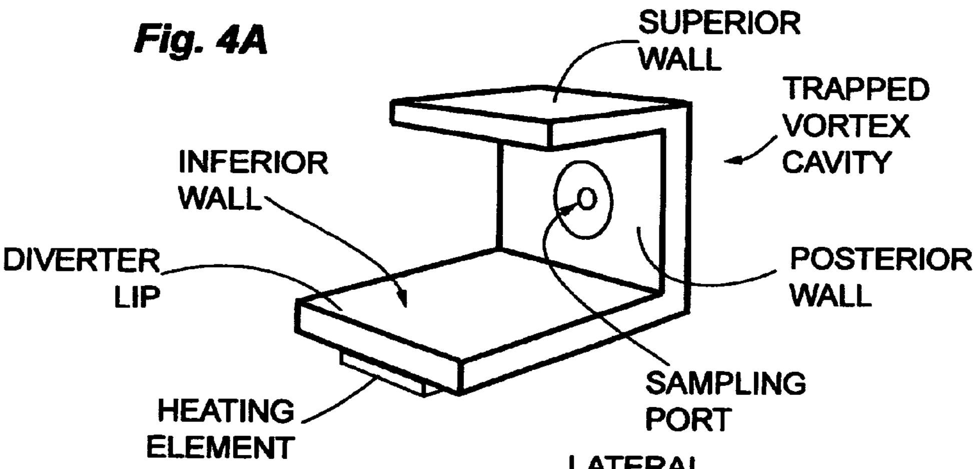
FIGS. 4A to 4C are detailed studies of a trapped vortex cavity with hot wall and vapor concentrate aspiration port.
Figure 4B:
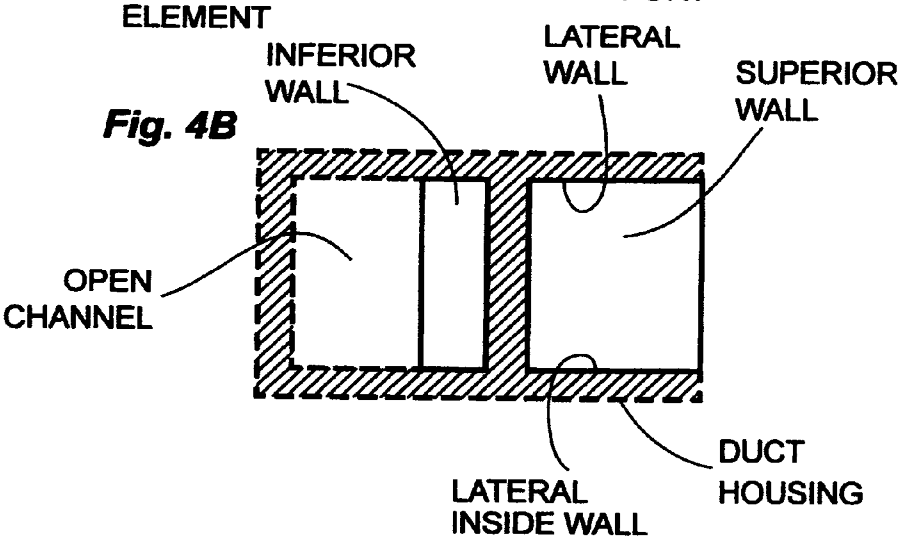
Figure 4C:
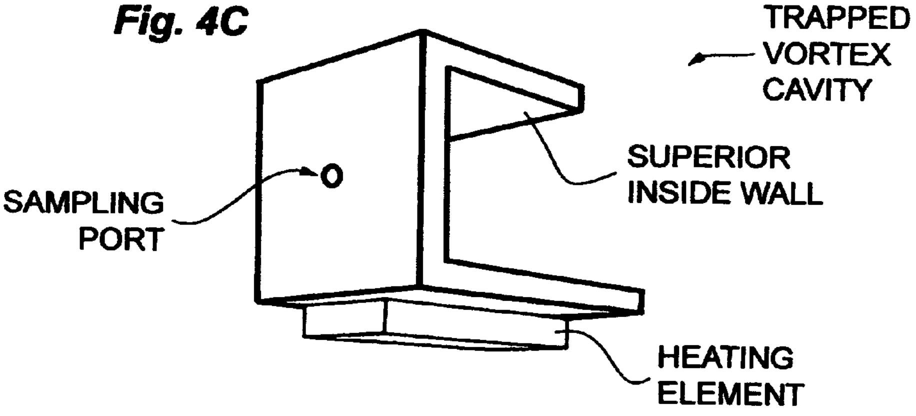

FIGS. 4A to 4C are detailed studies of a representative trapped vortex cavity as a subassembly. The cavity is supplied with a hot wall and a vapor concentrate aspiration port to which suitable tubulation may be attached. As shown here the insert is machined from a thermally conductive material and may be fitted to an orifice in the inlet ductwork, where the inlet ductwork enclosing wall is formed of a thermally insulative material.

For example, the cavity may be formed of a metal such as a stainless steel, a copper or a brass, and the enclosing wall of the main channel may be formed from a ceramic or a plastic having a low heat transfer coefficient.

While the aspiration port is presented here as an aperture in the cavity wall, in other instances it may be desirable to exclude liquid water by using a microporous filter or wall segment that is hydrophobic. Alternatively, water droplets may be captured in an upstream plenum of the apparatus.

FIG. 4A is a perspective view looking into the cavity and permits identification of the inferior wall which functions as a forward-facing step for particle impaction. Also identified are the posterior wall, shown here with sampling port aperture, and the superior wall forming the roof of the cavity. The inferior wall defines the diverter lip which impinges into the gas flow in the main channel. Attached below the inferior wall and front-facing step is a heating element.

FIG. 4B is a cross-sectional view, including a section (hatched) through the enclosing walls of the inlet flow duct. The view is looking down at the trapped vortex subassembly from the mouth of the intake. Shown on the left is the freespace of the open channel. Nearer the centerline is the forward-facing step of the inferior wall, and rightmost is the top face of the superior wall of the cavity. Also represented in this view are the lateral inside walls of the cavity, which are formed by the insulative material that makes up the inlet ductwork or housing.

The specifics of construction of the trapped vortex illustrated here are for demonstration of the principles of the invention and are not intended to limit the invention thereto. As will readily be appreciated, while it is advantageous to machine a trapped vortex cavity as shown for insertion into a receptacle in the bulk flow ductwork or housing, other fabrication technologies may be used. Modification of the apparatus as suitable to adapt a particular fabrication technology for its manufacture does not depart from the teachings and spirit of the invention as disclosed herein.

The dimensions of a trapped vortex cavity are generally proportioned to ensure that the cavity is stable and that gas in the cavity is long resident and has a slow washout time in the absence of active aspiration of sample through a sampling port formed in an interior wall within the cavity. Care is taken that the vortex is not destabilized by the flow of bulk gas in the main channel. A cavity may be 10 cubic millimeters, 3 cubic millimeters, or 30 cubic millimeters depending on the geometry of the main flow channel and the concentration of particles in the bulk flow. Generally, smaller is better; a smaller trap ensures a greater concentration of volatiles per unit volume and also ensures economy of heating by providing a more intimate contact between the resident eddy gas flow and the surrounding heated walls.

Similarly, the dimensions of the main channel on the inlet side may be about 1 $cm^2$ or smaller, the object being to obtain a laminar flow regime or transitional laminar flow regime so as to create a weakly stirred boundary layer between the circulating vortex and the streamlines of the bulk flow. This increases the "curtain effect" between the fast moving transient volume of bulk flow gas moving past the trapped vortex cavity and the resident gas volume of the stable eddy within the trapped vortex cavity.

A laminar flow regime naturally emerges from use of an upstream air-to-air concentrator with skimmer, thus the apparatus displays a native compatibility with upstream concentrators operative in with laminar flow, but is not limited thereto. Laminar flow is also encouraged by adjusting the length of the inlet gas duct. Optimal results are obtained by configuring the cross-sectional area in the inlet gas duct so that Re is less than 3000, more preferably less than 1000, and most preferably between about 200 and 800. Both slit type and annular devices are envisaged.

FIG. 4C is a perspective view from the back of the trapped vortex cavity, and illustrates more clearly the position of the superior wall, the inferior wall and the posterior wall, which is perforated by a sampling port. The open space between the superior wall and the inferior wall is the anterior surface of the trapped vortex cavity. This surface forms the opening to the main channel where the two gas flows, the bulk flow and the trapped vortex flow, contact each other. Also shown is a heating element in thermal contact with the particle impaction surface. It is desirable to ensure that particles impacting on this surface are fully volatilized. Vaporization leads to development of a vapor saturated stream that flows along the inferior wall and climbs the posterior wall so that sampling at any point in that circulation results in a highly concentrated vapor stream directed for analysis.

Figure 5A:
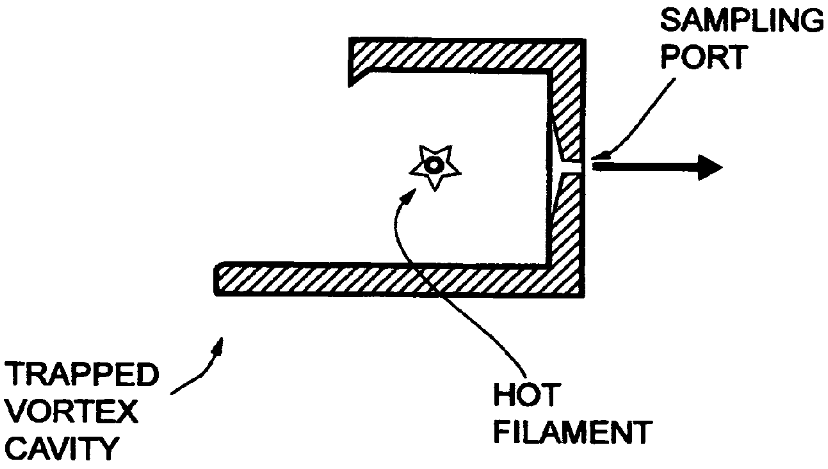
FIGS. 5A and 5B depict a hot filament for heating the trapped vortex.
Figure 5B:
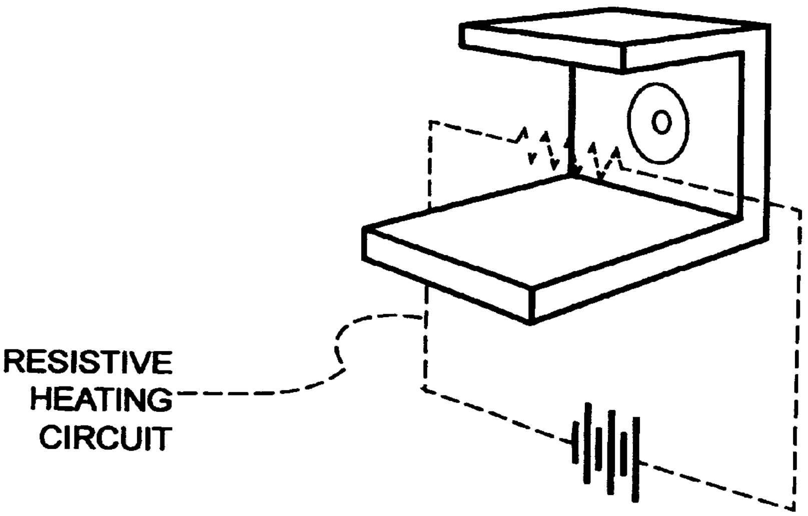

FIGS. 5A and 5B depict a hot filament for heating the trapped vortex. As shown in FIG. 5B, a hot wire filament is suspended across the midline of the trapped vapor vortex. In this embodiment, heat is radiated to the walls of the cavity. The central location of the hot filament is illustrated in cross-section in FIG. 5A. A simple circuit enabling resistive heating is depicted.

Other heating devices are readily incorporated, for example an infrared diode mounted on the roof of the trapped vortex cavity, or a flash heater incorporating a radiant filament for strobe actuation, a ferromagnetically permissive layer for inductive heating, or resistive heating elements embedded in one or more walls of the trapped vortex or thermally coupled thereto.

While adsorbent matrix beds have the disadvantage that they must be cooled during the loading phase and flash heated to release analyte during the regenerative phase, it can be seen that the trapped vortex can be operated in true continuous mode, or can be periodically thermocycled if desired.

Figure 6:
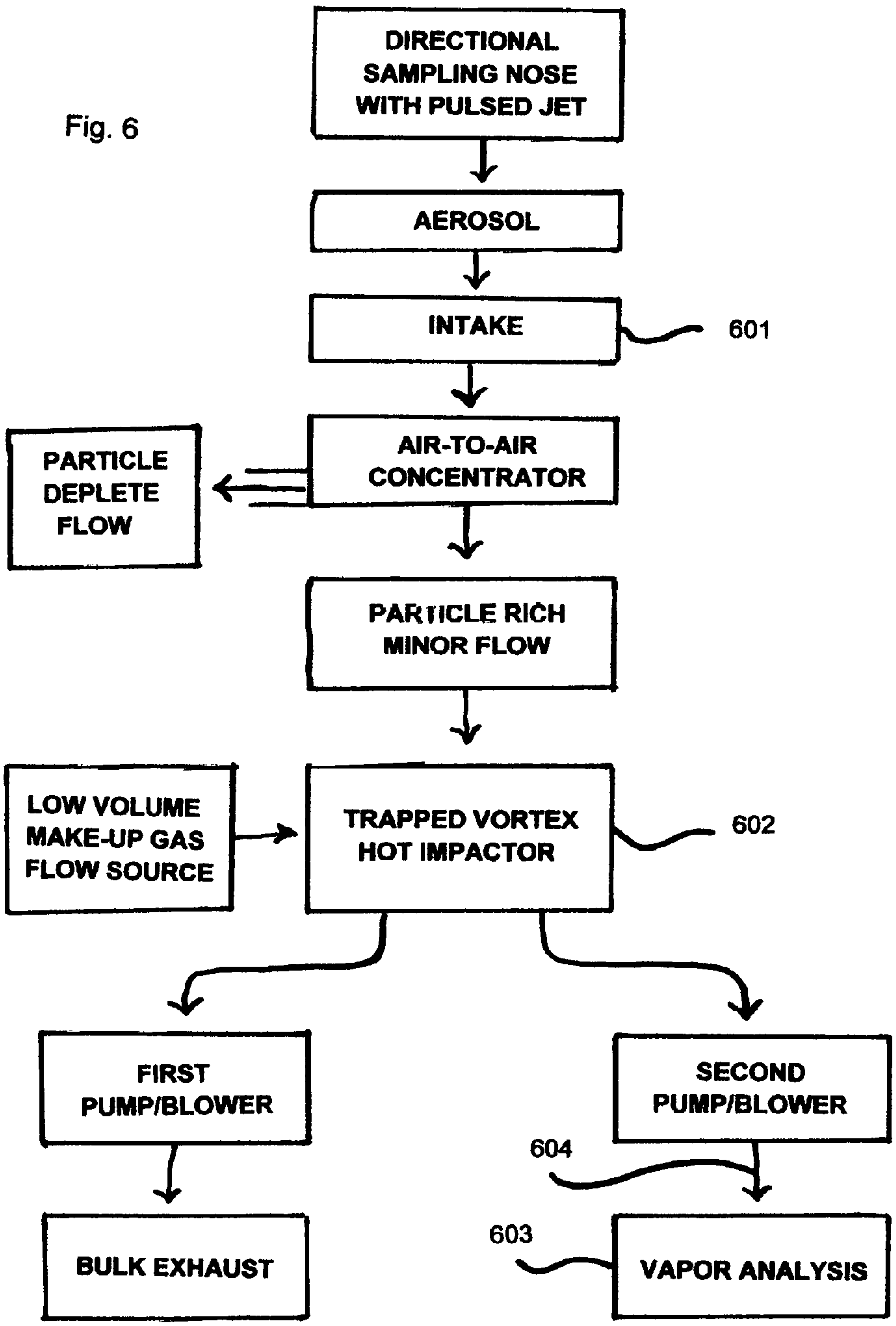
FIG. 6 is a schematic of a vapor collection and analysis system, such as finds use in explosives detection. The trapped vortex solid-to-vapor collector may be functionally integrated with an upstream aerosol intake and a downstream analytical module. The figure outlines process flow through the apparatus.

FIG. 6 is an overview and block diagram of a vapor collection and analysis system, such as finds use in explosives detection. The trapped vortex solid-to-vapor collector is functionally integrated with an upstream aerosol intake and a downstream analytical module, and process flow through the apparatus is represented schematically.

Three basic functional blocks are identified. An intake 601, a trapped vortex cavity with heated impactor 602 and a vapor analysis module 603. Bulk gas is exhausted to waste via the outlet gas duct, but alternatively can be subjected to additional free vapor and fine particle capture techniques if desired. A vapor concentrate formed in the trapped vortex cavity is conveyed at a low flow rate (604) to an analysis unit, where target analytes of interest are identified. In addition, a directional sampling nose with pulsed jet is provide to dislodge particles from the surface at interest so they may be sucked up in the aerosol into the intake 601. An aia-to-air concentrator may be added inside the intake 601 to concentrate the inflowing air into a particle rich minor flow which proceeds toward the trapped vortex hot impactor 602, and a particle depleted flow which is exhausted from the inlet duct. A low volume make-up gas flow source can provide make-up gas to the trapped vortex cavity to make up for gas that is withdrawn by a second pump/blower for vapor analysis, and the gas that is not trapped in the trapped vortex cavity is exhausted by the first pump/blower for bulk exhaust.

The intake function may be simple or complex. In a simple intake, an open nozzle is used, and the gas flow is driven by a suction pump, centrifugal blower or fan operatively coupled to the outlet exhaust. In more complex renderings, the intake may include a directional sampling nose with jets for dislodging particles from surfaces. Also of value is an air-to-air concentrator which splits the raw aerosol entering the intake into a particle rich minor flow and a particle depleted flow, so that the particle-enriched minor flow is what serves as feed for the trapped vortex vapor concentrator unit.

Figure 7:
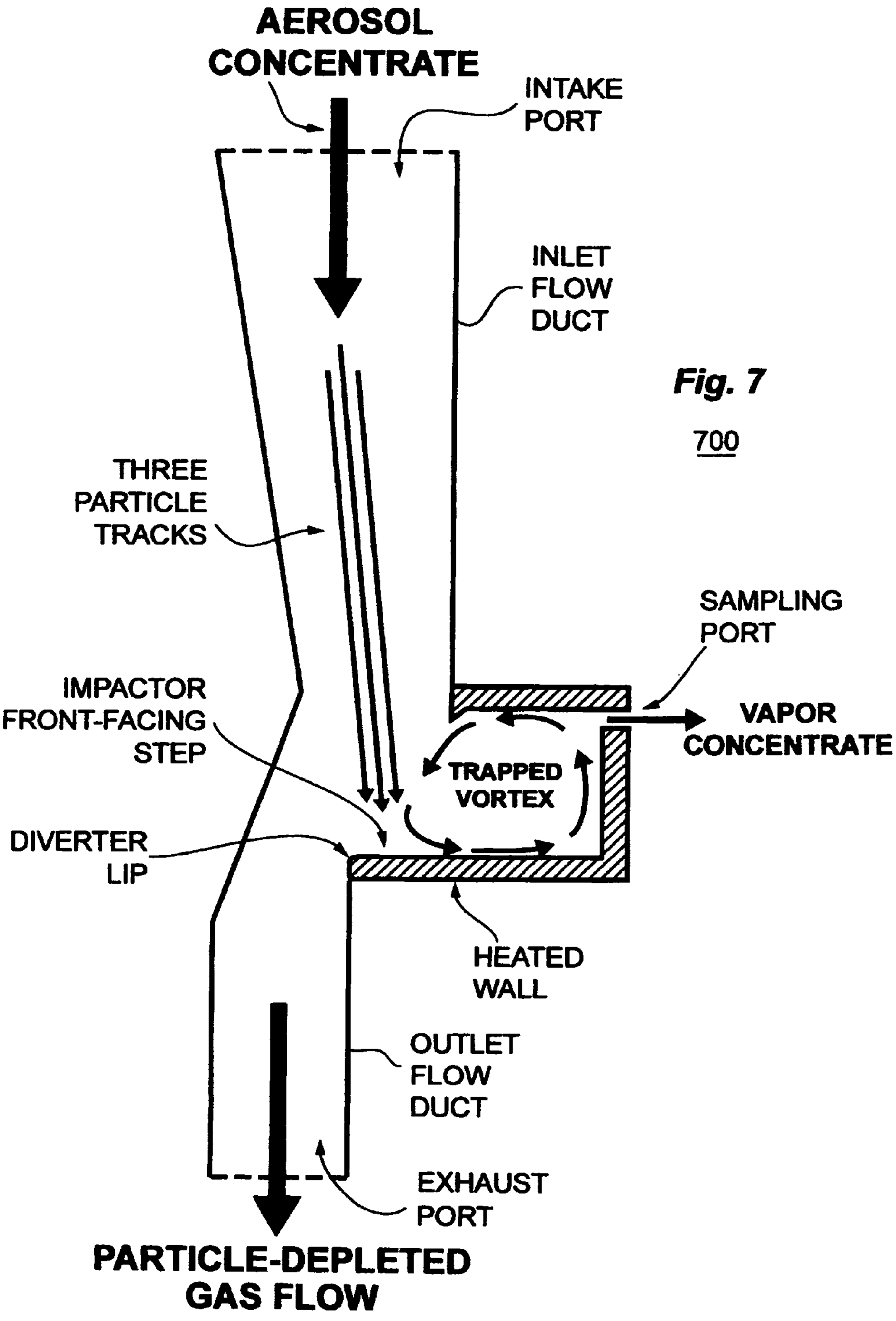
FIG. 7 is a simplified representation of the particle impaction process and trapped vortex flow patterns of a trapped vortex impactor.

FIG. 7 is a simplified representation of the particle impaction process. The elements of the trapped vortex vapor concentrator are generally as already described, and include an intake port for receiving an aerosol concentrate into the inlet ductwork, a trapped vortex cavity laterally disposed at the terminus of the inlet duct and a diverter lip and front-facing step forming the entrance to the outlet duct. The front-facing step impinges into the gas flow in the main channel so that gas streamlines of little or no mass are readily diverted and flow into the outlet channel, but particles, by their greater inertia, cross through the curtain that separates the bulk flow from the trapped vortex flow and collide with the particle impaction surface and heated wall at the base of the trapped vortex cavity. Vapors evolving from the heated wall are concentrated cyclonically in the trapped vortex and may be withdrawn through the sampling port.

Shown are three particle tracks in the center of the inlet duct that are directed at and impact on the inertial impaction surface at the lower leading edge of the trapped vortex cavity.

Figure 8:
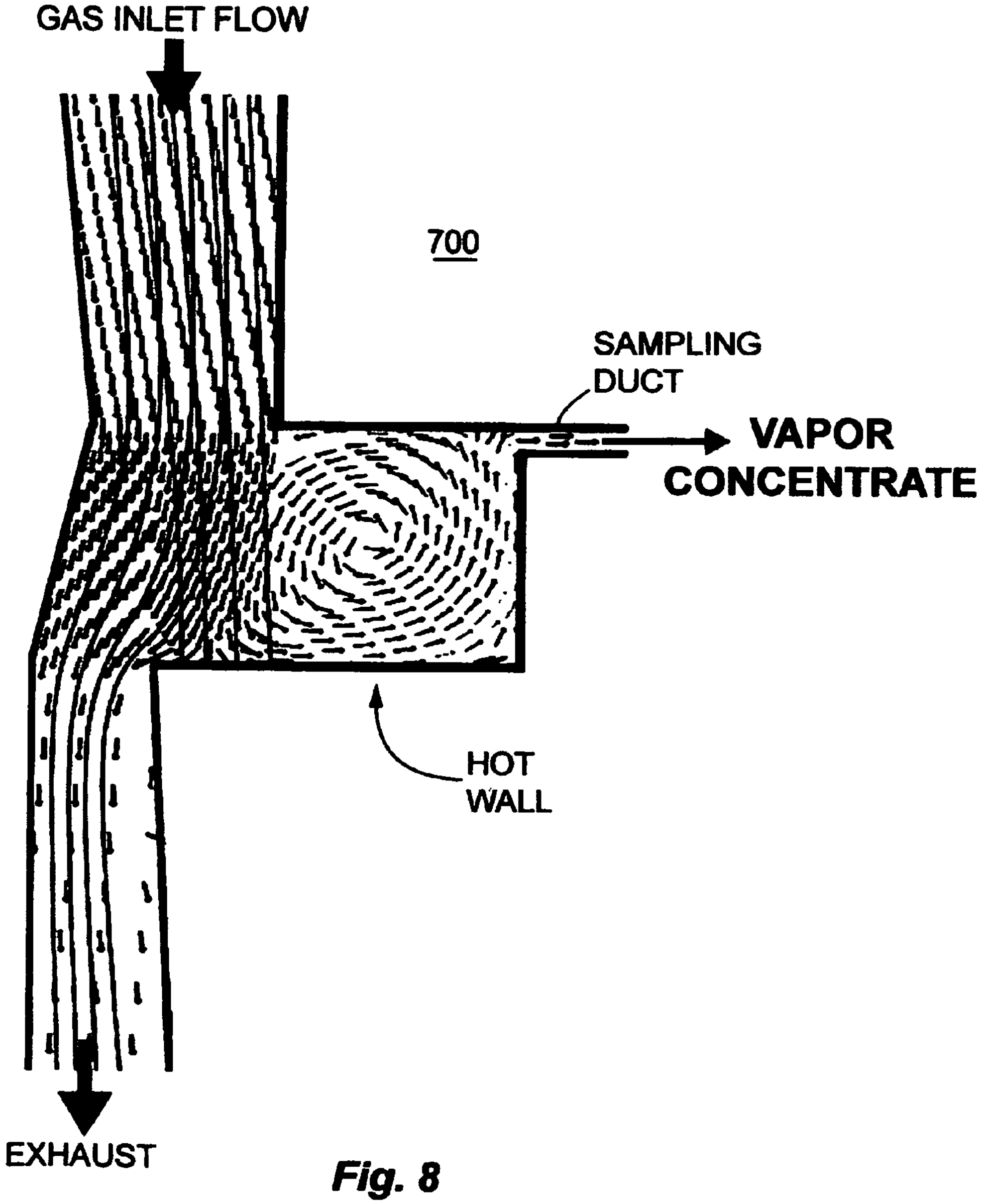
FIG. 8 depicts streamline flow and particle tracks in more detail.

FIG. 8 depicts a more complex particle and streamline flow in more detail as modeled by computational fluid dynamics. Gas streamlines are represented by short arrows that change direction easily in the flow channels. Particle tracks are represented by solid lines, those that impact are straight lines having a higher inertial moment, and those that curve are the tracks of smaller particles that are bent by the bending of the gas streamlines. Thus a classical analysis of cut size serves to characterize the efficiency of the impaction process as a function of particle size as will be shown below.

Within the trapped vortex, the resident gas flow is shown to be cyclonic. Sampling is depicted by arrows of gas flow entering the sampling duct to the top right of the cavity. In this view, a corresponding volume of the bulk flow is drawn into the vortex from the left along the top surface of the front-facing step, as is necessary to satisfy mass balance given the continuous withdrawal of vapor concentrate on the right.

Figure 9A:
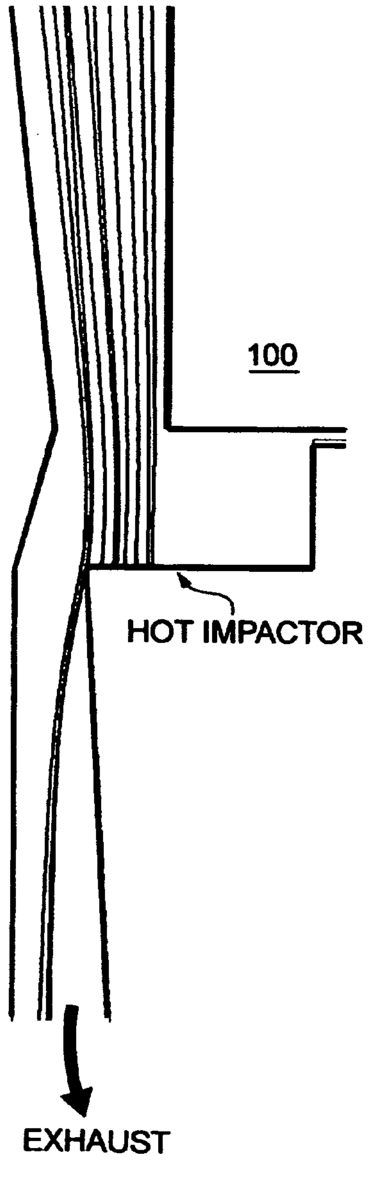
FIGS. 9A and 9B depict particle impaction patterns in the concentrator of FIG. 1 versus FIG. 2.
Figure 9B:
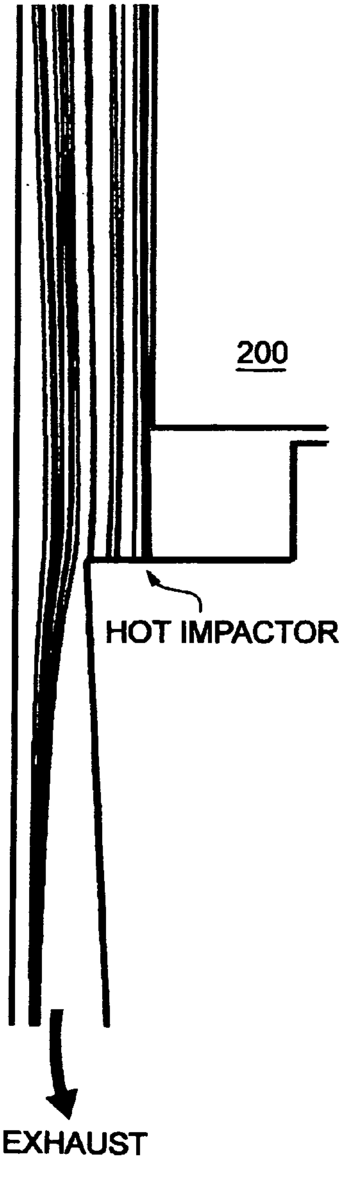

FIGS. 9A and 9B compare 50 micrometer particle impaction patterns in the concentrator of FIG. 1 versus FIG. 2. As can readily be seen, the contour of the inlet duct has a substantial impact on particle capture. A parallel walled duct, unless particles are otherwise focused, is relatively inefficient in capturing particles due to the free channel to the left of the front-facing step. However, by constricting flow and aligning the outside channel wall as shown in FIG. 9B, substantially higher particle capture efficiency is obtained.

Figure 13:
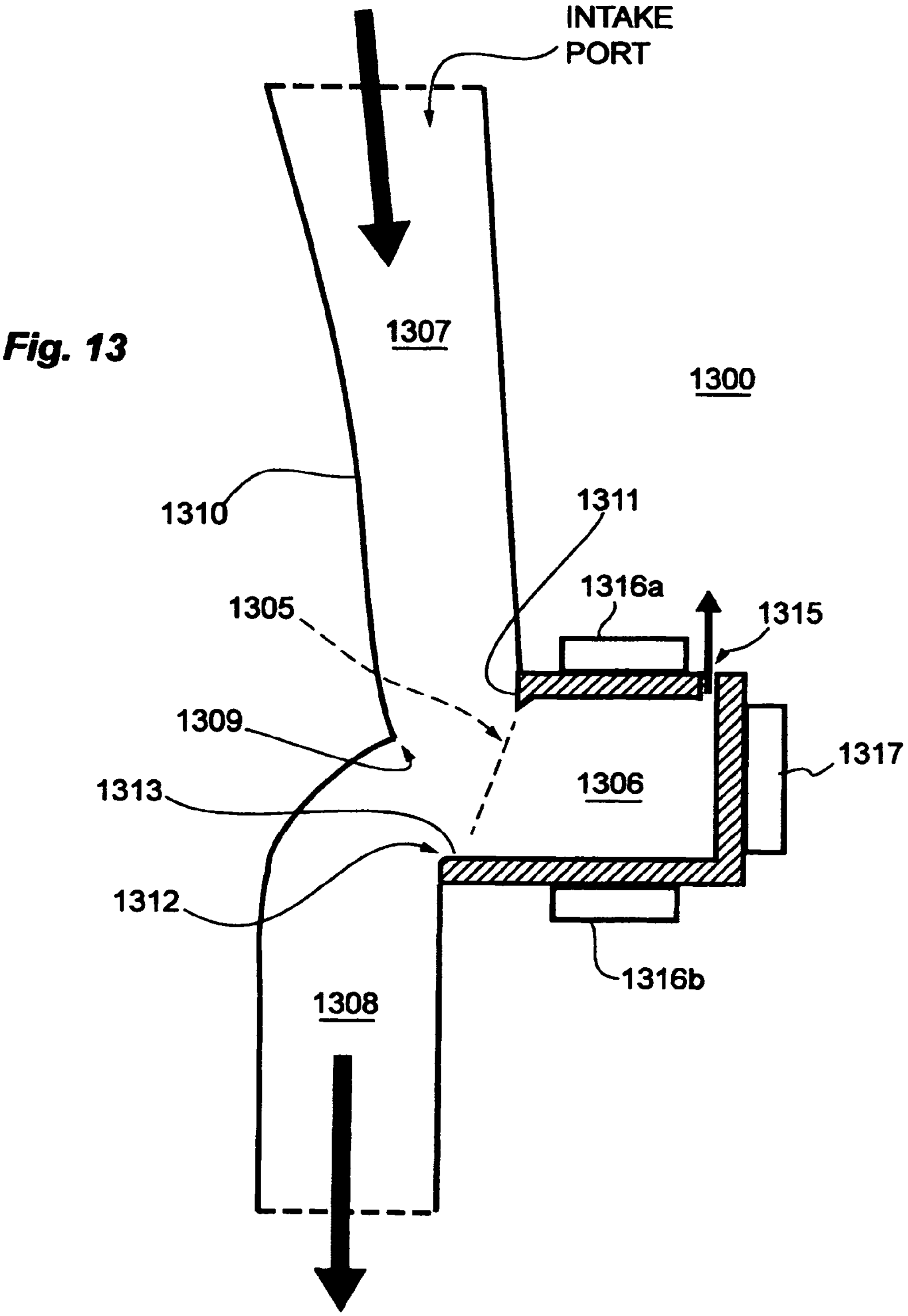
FIG. 13 is a schematic view of a third embodiment of an aerosol impactor with trapped vortex solid-to-vapor concentrator and contoured flow channel.
Figure 14:
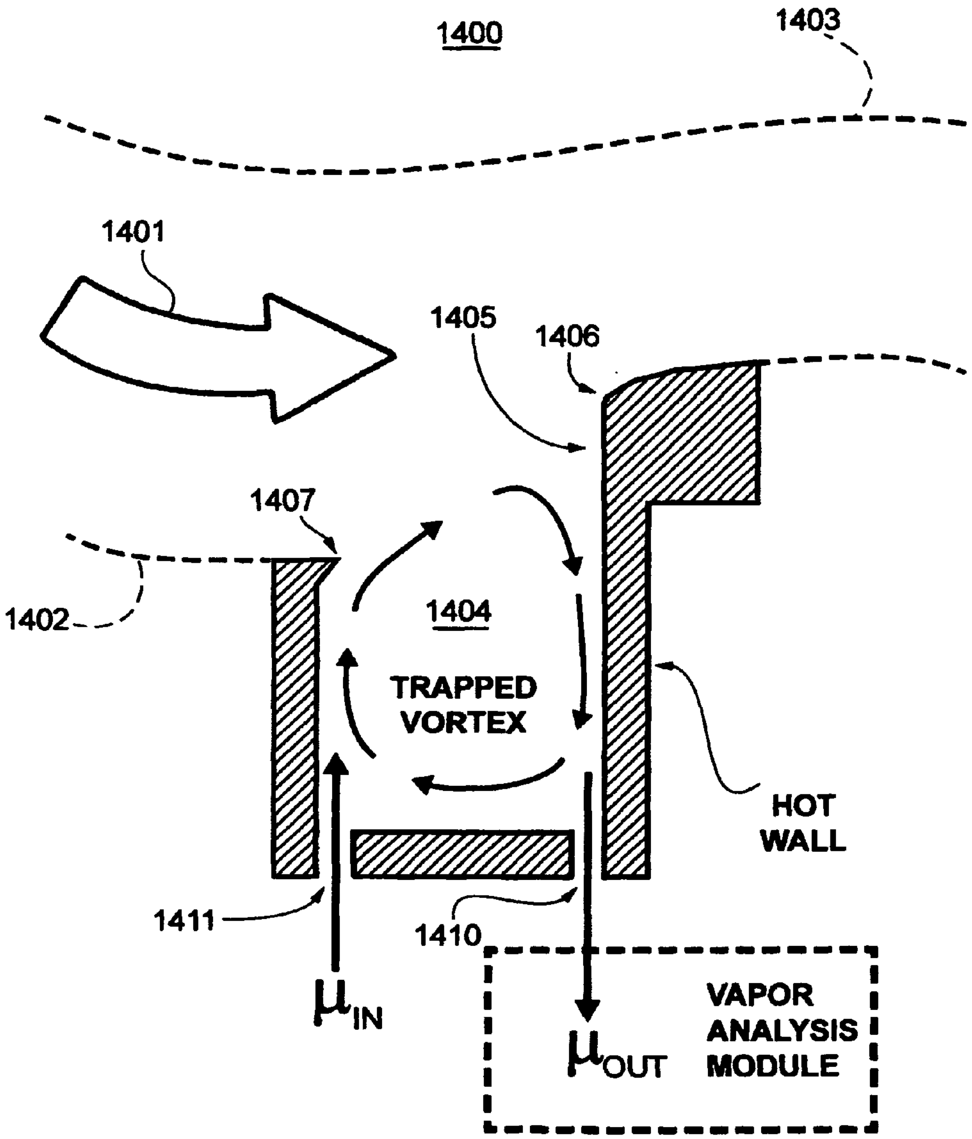
FIG. 14 depicts a trapped vortex cavity with make-up gas feed where mass flux IN and mass flux OUT are proportioned to limit ingress of gas from the bulk flow into the trapped vortex cavity, while not limiting particle impaction.

FIG. 10 is a plot showing particle collection efficiency of the impactors of FIG. 1 versus FIG. 2 as a function of particle size. A cut size of approximately 10 micrometers aerodynamic diameter (AD) is obtained with the contoured vapor concentrator of FIG. 1, whereas the cut size increases to about 50 micrometers for the impactor of FIG. 2. However, this is a matter of optimization and both configurations rely equally on the more basic principles of operation exhibited in the hot wall trapped vortex vapor concentrator of the invention. Since vapor collection efficiency will be a direct function of particle collection efficiency, standard methods for designing the front face step as an impactor surface may be used to optimize the design. Also it will be appreciated that apparent aerodynamic diameter is plotted here, and because explosives, for example, are significantly more dense, the plot systematically underestimates collection efficiency. Contoured trapped vortex designs having higher efficiencies are illustrated in FIGS. 13 and 14.

While technically challenging, it is possible to focus particles in any design using prefocusing elements, aerodynamic lenses, or subassemblies so that the particle stream is preferentially disposed near the inside wall of the inlet flow duct as it approaches the impactor face. These and other improvements are conceived within the teachings disclosed here and are variants that may be incorporated, mutatis mutandi, within working applications of the invention.

Figure 11A:
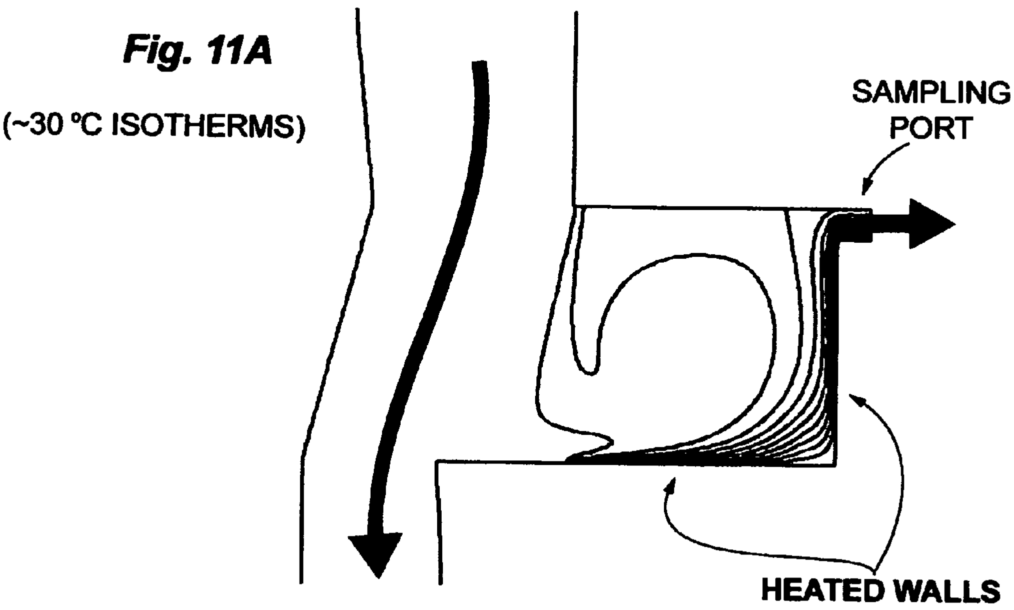
FIGS. 11A and 11B depict the heating process, and are views of temperature isotherms in the trapped vortex cavity in response to heating posterior and inferior walls to 300° C.
Figure 11B:
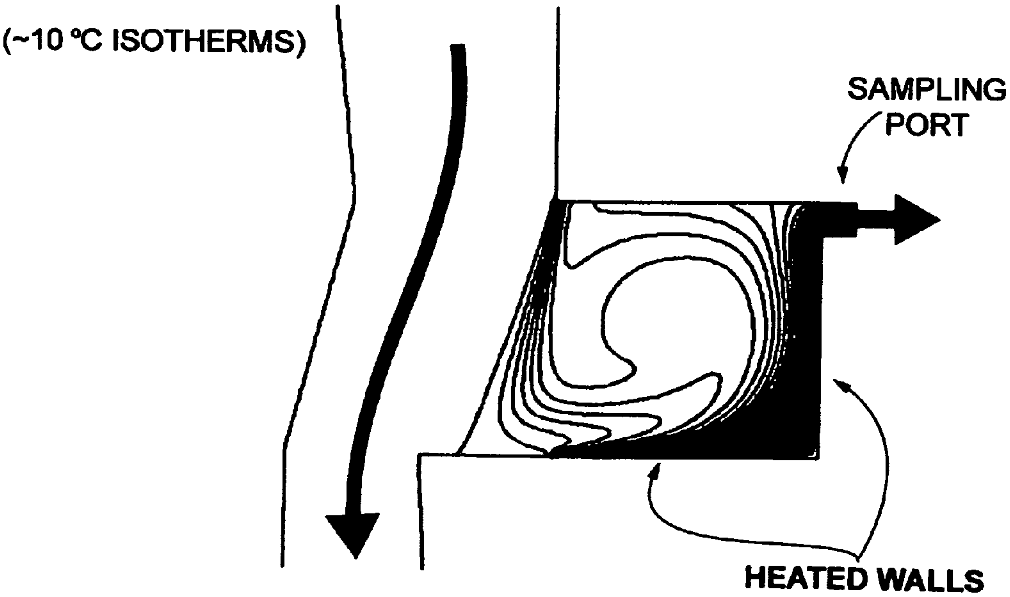

FIGS. 11A and 11B depict the heating process, and are views of temperature isotherms in the trapped vortex cavity in response to heating posterior and inferior walls to 300° C. FIG. 11A shows temperature steps of about 30° C.; FIG. 11B shows temperature steps of about 10° C. In the apparatus depicted in this figure, heating elements where applied to the inferior and posterior walls of the vortex cavity as shown. As shown here, the cyclonic flow is counterclockwise. The walls were heated to 300° C. and temperatures of the gas flowing across the hot walls was modeled to produce a 2-dimensional views of the developing isotherms, this demonstrates that the eddy is not disrupted by convection of heated gas and also shows that the hottest gas, which will contain the highest concentration of vapors from particles deposited on the inertial impactor face of the trapped vortex (forward-facing step) is effectively drawn into the sampling outlet, positioned here at the upper right in the cavity on its posterior wall.

Figure 12:
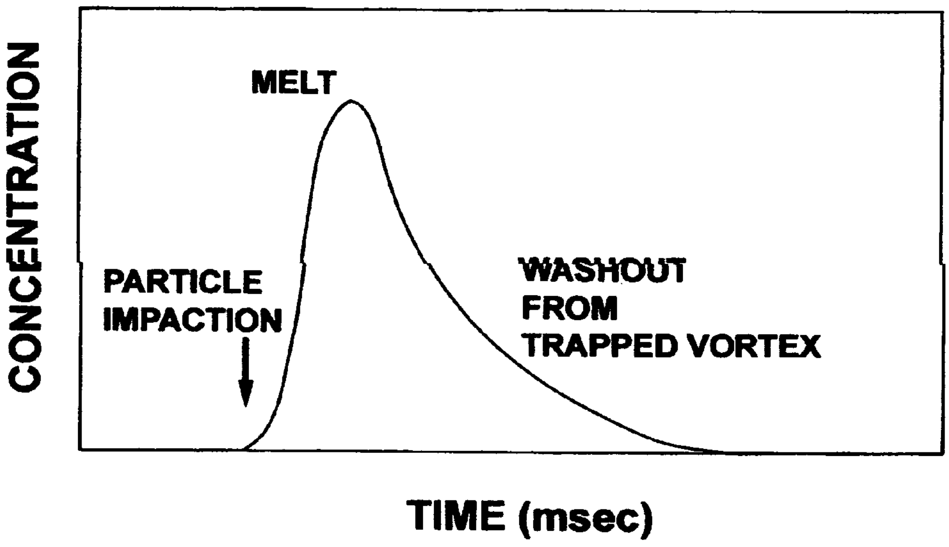
FIG. 12 represents target analyte concentration in the trapped vortex cavity during particle capture, vaporization, and analyte washout.

FIG. 12 represents target analyte concentration in the trapped vortex cavity during particle capture, vaporization, and analyte washout. Dilution rate at steady state is the flow rate IN to the trapped vortex cavity divided by the cavity volume. Flow rate IN is balanced by a corresponding flow rate OUT because the cavity volume is constant.

Concentration in the trapped vapor cavity decreases at a rate proportional to its value, $$\frac{dN}{dt} = -\lambda N$$

as solved by an exponential rate equation, $$N_t = N_0 e^{-\lambda t}$$

where N is a target analyte concentration, such that the concentration $N_t$ at time t is equal to the initial concentration $N_0$ times an exponential decay constant λt.

This can be simplified by taking the natural log $$\ln N_t = -\lambda t + C$$

where C is a constant equal to the peak concentration in the trapped eddy. Residence time τ can be calculated using natural logarithms, such that:

$$\tau = \frac{t_{0.5}}{ln2} = 1.4427 * t_{0.5}$$

where the half life, $t_{0.5}$, of decay of the analyte concentration is a useful comparator for results under different operating parameters. Residence time can be adjusted by varying aspiration rate from the vortex cavity, for example. As shown in FIG. 12, the concentration of analyte in the vortex undergoes a three stage development. Initially, concentration rises slowly and the particle melts. At the boiling temperature of the volatile, the particle is rapidly vaporized, leading to a sharp increase in concentration in the resident volume of the chamber. Then, due to washout, the concentration decreases according to an exponential decay constant. The rate of washout is a function of the mixing rate of bulk flow with the resident vortex flow and of the sampling flow rate, which results in ingress of diluent gas, either from the bulk flow or by injection of a make-up gas volume in proportion to the sampling flow rate.

However, by design of the back-facing step and front-facing step to minimize turbulent mixing at the interface between the bulk flow and the resident vortex, washout with loss of target analyte can be largely minimized. The primary advantage of using a make-up gas instead of allowing ingress of the bulk flow to balance losses to sampling is that admixture of the sample with interferents in the bulk flow can be largely avoided.

As has not been readily appreciated, conditions may be chosen to optimize the transition of particles into the resident vortex volume and minimize ingress of outside air. The anterior face of the trapped vortex essentially behaves as a "curtain" under laminar conditions such that particles cross through the curtain but gas admixture at the boundary layer is minimal. Under these conditions, interferents such as water vapor and environmentally non-specific nitrates can be readily excluded from the analysis, a clearcut advance in the art.

FIG. 13 is a schematic view of a third embodiment 1300 of an aerosol impactor with trapped vortex solid-to-vapor concentrator and contoured flow channel.

The flow characteristics of an aerosol entering the intake port at the top of the vapor concentrator assembly are shaped so that particles are directed against the virtual curtain 1305 separating the vortex chamber 1306 from the inlet duct 1307 whereas gas streamlines are diverted into the exhaust duct 1308. A convergingly contoured outer wall directs the particles against the particle inertial impactor face of the trapped vortex at higher efficiency, taking maximum advantage of the low inertial moment of the gas streamlines.

Particle impaction is further enhanced by introducing a linear momentum to the particles as they accelerate over a deflector ramp 1309 or baffle on the contralateral lower wall 1310 of the inlet flow duct. The deflector surface is angled to urge the particles toward the opposite wall and hence, into the trapped vortex cavity.

While not shown, optionally the trapped vortex cavity has an adjustable geometry at the wall separation baffle or separator lip on the back-facing step 1311 that forms the roof of the cavity. This element can be an active element that is mechanically actuated to optimize isolation of the trapped vortex eddy from the bulk flow. Similarly, the diverter lip 1312 on the forward-facing step 131 may be an active element to further optimize the particle trapping and flow separating effects at the lips of the trapped vortex cavity.

As illustrated here, the sampling port 1315 is situated on the superior face of the trapped vortex cavity, and two heating blocks are shown, one each (1316*a*, 1316*b*) on top and bottom of the cavity. It should be borne in mind that the apparatus is preferentially operated in a reclining position, such as is achieved by rotating the FIG. 90 degrees clockwise so that the trapped vortex cavity is pendant from the main channel ductwork.

Gravity thus assists in collecting larger particles, such as crystalline residues of explosives having higher density. Sedimentation of dense particulate material is readily apparent under these conditions and residence time in the inlet. Volatile residues in explosives crystals, for example, are typically quickly vaporized at temperatures approaching or exceeding 300° C. (depending on the kinds of target analytes of interest). Particles may also contain plasticizers and solvents or co-solvents such as acetone and glycerol, so as to be sticky, and adhere to the internal surfaces of the trapped vortex cavity, from which they are volatilized by the heat. Volatilization may involve some decomposition, but complete gasification into simple molecules such as carbon dioxide is less preferred. In a more preferred analysis, volatilization results in a fingerprint of readily identifiable molecules.

It is desirable to periodically clean sand, ash and fibers from the vortex trap, and a piezoelectric crystal 1317 mounted on the pendant surface of the cavity facilitates this function. Actuation of the piezoelectric crystal impels sedimented material back into the bulk flow from which it is blown to exhaust. Various acoustic and ultrasonic materials may be used to generate a cleaning action and can serve to facilitate more rapid gasification as needed.

Surprisingly, acoustic cleaning has little or no effect on the stability of the trapped vortex recirculation, again pointing to the two flows as having a sort of curtain-like separating boundary, where particles by virtue of momentum easily pierce the veil, but gas streamlines poorly mix. Thus the ultrasonic cleaning function can be operated during vapor concentrate sampling and under very dusty conditions, can be operated at regular periodicity during sampling without loss of analyte, a finding that would defy prediction.

In an alternative collector, not shown, wall elements of the trapped vortex cavity may be electrostatically charged so as to trap particles according to their electrical charge. These wall elements are heated and serve the same purpose for delivering a vapor concentrate to the aspiration outlet. However, particles that have been ionized upstream in the gas flow can advantageously be directed to the cavity by electrostatic repulsion from the contralateral wall 1310 of the inlet flow duct 1307.

FIG. 14 depicts a trapped vortex cavity 1400 with make-up gas feed where mass flux IN and mass flux OUT are proportioned to limit ingress of outside air from the bulk flow into the trapped vortex cavity—while not limiting particle impaction. Bulk flow 1401 is from left to right (large arrow). The enclosing walls (1402, 1403) of the inlet and outlet ductwork are depicted by dotted lines. The trapped vortex cavity 1404 is shown with solid hatching. An impactor face 1405 and diverter lip 1406 are defined on the upstream face of the front-facing step and a flow separation feature 1407 on the downstream face of the back-facing step. In a preferred embodiment, the gas entering the inlet duct is flowing in a laminar flow regime defined by Re<1000 or a transitional laminar flow regime defined by Re<3000.

Two ports are defined within the trapped vortex cavity. The first is a sampling outlet port 1410, the second a make-up gas inlet port 1411. Flow in the trapped vortex is clockwise so that vapors emitted from particles on the impactor surface are elegantly directed into the sampling port and make-up gas flows first to the curtain surface between the vortex circulation and the bulk flow.

Without make-up gas, a small fraction of the bulk flow enters the trapped vortex cavity, in part due to shear layer mixing and in part as required for mass balance given the withdrawal of gas from the cavity to the analysis module. This mass imbalance between the cavity and the bulk flow can effectively limit losses through leakage of the gas resident in the trapped vortex back into the bulk flow in the inlet. The resident gas in the trapped vortex and the transient gas volume flowing through the inlet duct are thus essentially separated and not-comingled at an interface under laminar flow conditions. Some turbulent mixing at the shear layer interface is to be expected but can be minimized by proper selection of flow conditions and geometry.

With make-up gas such that the sampling mass flux OUT and the make-up gas flux IN are equal ($\mu_{IN}=\mu_{OUT}$), the mass balance is satisfied without ingress of ambient air from the inlet channel. Use of cold air or a denser gas such as argon or neon has a positive effect on the integrity of the veil separating the bulk flow from the vortex cavity. Integrity of the curtain boundary (see FIG. 13, 1305) can result in exclusion of well-known analytical interferents, particularly water vapor that interferes with a number of analytical modalities, harmless nitrates, pollutants, jet exhaust, vehicle exhaust, and so forth, that can result in false positives. Conversely, loss of target analyte to the bulk flow through turbulence and mixing at the boundary interface is also minimized.

Thus in one embodiment a shear layer forms under laminar flow conditions at the interface between the gas stream flow and the trapped vortex circulation. A critical streamline layer defines the proximate layer of the gas flow and a boundary layer or virtual curtain defines the interfacial boundary of the vortex and the gas stream. Advantageously for this embodiment, particles, not streamlines, cross the interfacial boundary, minimizing dilution of the vapor concentrate with ambient contaminants such as water vapor and exogenous nitrogen compounds, sulfates, and jet or vehicle exhausts, for example.

In one embodiment, a dopant vapor may be required to provide ionic charge moderation during analysis, as described in U.S. Pat. No. 5,491,337 with respect to ion mobility spectroscopy. A small flow of dry air is conveniently provided through a dopant chamber, where vapor diffusing from a diffusion capsule is carried into the make-up gas entering trapped vortex, and from there into the analytical unit and detector. Thus control of the composition, flow rate, and geometry of the make-up gas flow is found to have benefits in optimizing detection. Dopant may also be added in a small amount to the make-up gas mixture so as to serve as a calibrant for quantitative measurements, for reference, and for spike recovery validation, as would be indicative of a malfunction or leak.

Contouring of the opposing, contralateral wall 1403 of the collector of FIG. 13 may also take advantage of a Coanda wall attachment effect to direct gas streamlines to exhaust while relying on particle inertia to target the particles to an inside surface of the trapped vortex cavity. A throat may be used upstream of the splitter to impart a higher axial velocity to the particles prior to radially diverting the bulk flow streamlines into the exhaust by-pass with minimal pressure drop, such that the trapped vortex cavity is positioned on the radially inward side of the throat and the Coanda effect is produced by the flow turning contour of the opposing wall. A higher velocity in the throat assists in separating particles inertially.

A jog or discontinuity in the inlet walls may be positioned to improve particle collection efficiency. Some of the smaller particles may become caught in a boundary layer on the contralateral wall 1403 of the inlet. A surface discontinuity in this region serves to energize the boundary layer and release any particles therefrom so as to be driven into the trapped vortex cavity by the main stream inertia. Without this discontinuity some particles might remain within the boundary layer on the contralateral wall and be carried to exhaust. Surface discontinuities of this type are generally positioned upstream from the back-facing step of the trapped vortex cavity.

Figure 15:
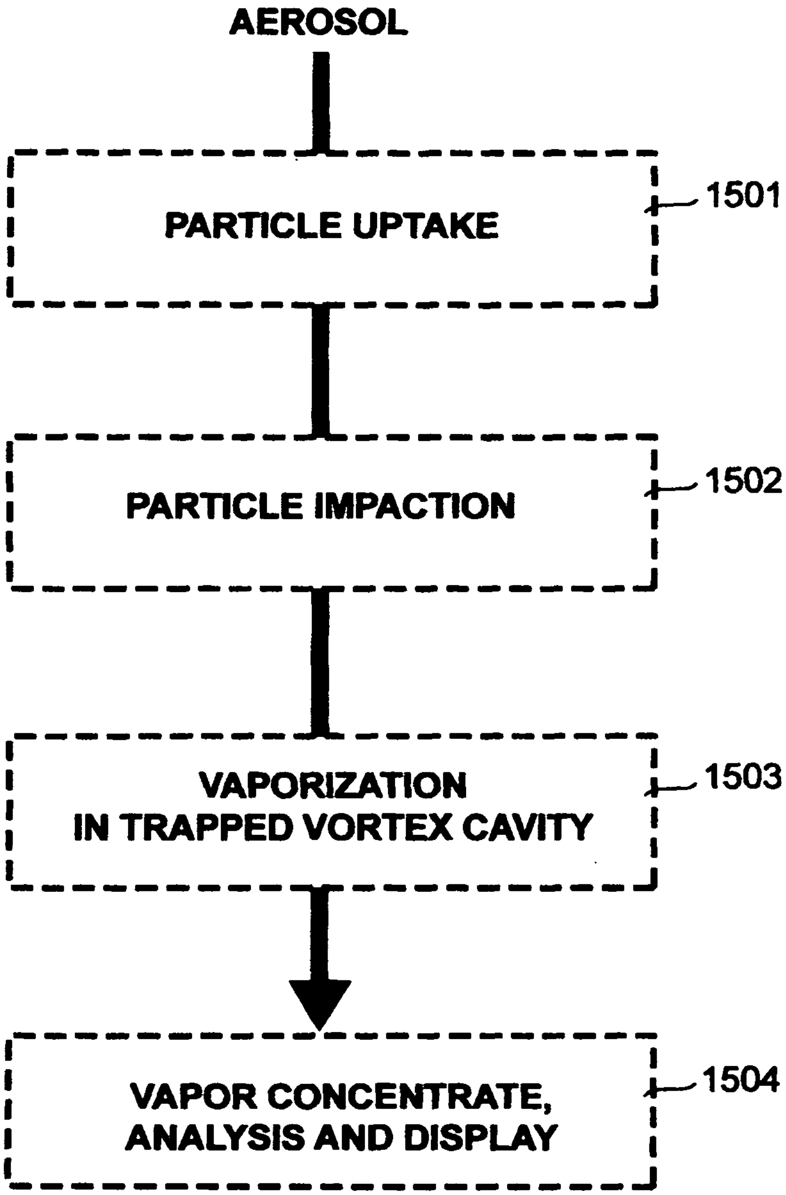
FIG. 15 is a view of a method for trapped vortex vapor sampling and analysis.

FIG. 15 is an outline of a method for vapor sampling and analysis using a heated trapped vortex cavity. In a first step 1501, the apparatus receives a gas stream containing suspended aerosol particles. The particulate fraction is impacted 1502 in a trapped vortex cavity while the remaining gas is exhausted. In the trapped vortex cavity, volatile constituents of the particle fraction, including molecules adsorbed to the particles, are vaporized 1503 at a temperature above their boiling points. The vapor concentrate entrained in the cyclonic flow within the trap are sampled for analysis 1504 by aspirating gas from the cavity and conveying the gas for downstream analysis.

In the first step 1501, particles enter the apparatus through an intake port. The particles may be dislodged from substrate surfaces and drawn or propelled into the intake using a blower or a suction pump or may be suspended in an air column which is fed into the intake.

Particles are accelerated in the inlet flow duct and impact on a front-facing step that forms a downstream surface (relative to the direction of gas flow in the inlet flow duct) of the trapped vortex cavity. The impactor surface defines a "diverter lip" that impinges on the long axis of gas flow. Particles may adhere to the impactor surface or collect in the trapped vortex cavity.

The internal surfaces of the cavity, and any particles in the cavity, are heated so that any volatile constituents of the particles, or adsorbed on the particles, are vaporized and mix with the cyclonic flow of gas in the trapped vortex. The vortex flow is generally isolated from the inlet gas flow by a boundary layer that can be drawn across the mouth of the vortex cavity. Because the cavity is generally formed having small dimensions, and is not shown to scale, the vapor concentration achieved in the cavity is significantly higher than would be achieved if the particle was volatilized in the main gas stream.

Then, at a low flow rate, the vapor concentrate is withdrawn from the vortex cavity. This hot gas particle extract is conveyed to an analysis module which houses a detector. The detector functions to analyze the vapor for target analytes of interest. The analytic module can also include apparatus for further concentrating the vapors of interest, and for archiving samples for study off line; however, the primary purpose of the analytical module is to cause an alarm to be displayed if a substance of interest is detected, and this is best accomplished in real time during continuous sampling and analysis.

In some instances, for example when further concentration is needed, a semi-continuous or batch process may be adopted. However, the preferred method utilizes real time sampling and analysis in a continuous and uninterrupted process. Where sampling analysis are performed cyclically with a cycle rate of less than a few seconds, the process is essentially continuous, such as occurs in rapid cycle IMS voltage scans or MS/MS, and for all intents and purposes the process functions as a continuous process. However, the need for manual insertion of a filter cartridge or an adsorbent cartridge into an analytical device is advantageously avoided.

In some instances, the process may include injection of a make-up gas into the trapped vortex cavity in proportion to the withdrawal rate for analysis. This provides the user the opportunity to substitute a dry gas in the sampling stream and to eliminate interferences in analysis such as from humidity or ambient nitrates and NOX compounds in the intake.

The process may also include upstream steps for use of jet-assisted resuspension of particles from surfaces in proximity to a suction intake. A directional nose with jets disposed peripherally on the nose generally includes a central or ventral suction intake port so that materials dislodged from a substrate are suctioned into the apparatus. Jets may be operated in a pulsatile flow regime for optimal results.

Also optional is a step for focusing particles in the inlet flow stream. Use of air-to-air concentrators is well known in the art. The flow split is matched to the flow capacity of the trapped vortex vapor concentrator. These steps are discussed in more detail below.

Systems Integration

The trapped vortex vapor concentrator delivers a vapor concentrate to an analytical unit. As a component of an integrated threat detection system, its valuation is substantial, forming the key piece that permits interfacing a high throughput gas flow rate with a low flow sampling rate without loss of sample and without interruption of analysis.

In building an integrated system for a dedicated application, other components may be interfaced to the trapped vortex concentrator. In addition to control and power circuitry, a jet-assisted directional nose, an air-to-air concentrator, and a detection system are components that can be adapted for use in a standalone package such as for baggage screening or a roving personal monitor or exposure meter. Both the portable and the large scale applications such as vehicle portals may be constructed by extension of the teachings provided here. Additional detail is given to offer a sense of the current state of the art, but the invention is not limited to the particulars provided here.

Jet-Assisted Particle Sampling

As will be readily appreciated, particles adherent to persons or objects may be dislodged and aersolized by application of pulsatile jets to a substrate surface. Generally a directional nose housing peripherally disposed jets and a central or pericentral suction stream is used to simultaneously dislodge particles and harvest them. Systems of this kind are described in US Pat. Appl. Nos. US 2011/0132108, US 2011/0186436, and 2011/020393, which are co-assigned. Related systems are described in U.S. Pat. Nos. 6,073,499, 6,861,646, and 6,887,710, for example.

Air-to-Air Concentrators

Particles in an aerosol may be concentrated using an air-to-air concentrator such as a combination of one or more aerodynamic lenses for focusing the particles and a virtual impactor. Aerodynamic focusing has been used to produce particle beams or ribbons according to the geometry of the virtual impactor. Gas streams are separated into a particle-depleted sheath or "bulk" flow and a particle-enriched "minor" flow. The two streams are separated according to a flow split, resulting in particle concentration in the minor flow. Particle concentration may be in the range of 9:1 to 100:1 to 200:1, for illustration.

An aerodynamic lens particle concentration system typically consists of four parts: a flow control orifice, at least one focusing lenses, an acceleration nozzle, and a skimmer. The choked inlet orifice fixes the mass flow rate through the system and reduces pressure from ambient to the value required to achieve aerodynamic focusing. The focusing lenses are a series of orifices contained in a tube that create a converging-diverging path resulting in flow accelerations and decelerations, through which particles are separated from the carrier gas due to their inertia and focused into a tight particle beam or ribbon under laminar flow conditions, generally at Reynolds Numbers less than 1000, although transitional Reynolds Numbers less than 3000 may also be used. The accelerating nozzle controls the operating pressure within the lens assembly and accelerates particles approaching the skimmer, which operates according to momentum, the gas streamlines diverging from the long axis of flow whereas particles cross the streamlines according to their inertia and enter the virtual impactor void of the skimmer, as is known in the art.

Focusing of a range of micron and submicron size aerosol particles has been carried out using aerodynamic forces in periodic aerodynamic lens arrays [see Liu et al, 1995, Generating particle beams of controlled dimensions and divergence, Aerosol Sci. Techn., 22:293-313, Wang, X et al, 2005, A design tool for aerodynamic lens system, Aerosol Sci Techn 39:624-636; US Pat. Appl. Doc. 2006/0102837 to Wang]. Such arrays may be used as inlets to on-line single-particle analyzers [see Wexler and Johnston (2001) in Aerosol Measurement: Principles, Techniques, and Applications, Baron and Willeke eds, Wiley, New York, and U.S. Pat. No. 5,565,677 to Wexler]. Aerodynamic lens arrays and skimmers are also described in U.S. Pat. Nos. 7,704,294 and 7,875,095, which are co-assigned to the Applicant.

Thus air-to-air concentrators are advantageously used to preconcentrate aerosols and are suitable for upstream application in the intake nozzle of systems incorporating the hot trapped vortex vapor concentrators of the present invention. The minor flow becomes the inlet flow for the trapped vortex apparatus; therefore the trapped vortex is dimensioned to accommodate the required flow rate. Because the pressure drop in the skimmer must be balanced across the bulk flow and minor flow outlets, it may be advantageous to use a separate blower or suction pump for both flow systems. The pressure drop in the trapped vortex apparatus is so low as to be almost negligible, but is a factor to be considered in specifying blower power and volumetric flux.

Detection Systems

Many detection technologies (e.g., mass spectrometry, ion mobility spectrometry, optical spectroscopy, etc.) have been developed over the years and trace detectors now exist that can detect a wide range of trace explosives, illicit substances, and chemical weapons, for example. But these devices are limited as a group by a bottleneck in sampling throughput and by the frequent need to resort to batch processing of filter membranes, pledgets, or periodic release of vapors from in-line adsorbent traps. The systems of the present invention overcome this disadvantage and may be coupled to any of the detection systems known in the art.

Detectors for analysis and identification of particles or vapors are known in the art and may be selected for physical, chemical or biological analysis. Detection methods include visual detection, machine detection, manual detection or automated detection. Means for detecting include laser particle scattering, liquid chromatography (LC), high pressure liquid chromatography (HPLC), high pressure liquid chromatography with mass spectroscopy (HPLC/MS), gas chromatographic mass spectroscopy (GC/MS), gas chromatography coupled to electrocapture detection (GC-ECD), atmospheric pressure ionization time-of-flight mass spectrometry (TOFMS), ICP-mass spectrometry, ion mobility spectroscopy (IMS), differential ion mobility spectroscopy, secondary electrospray ionization-ion mobility spectrometry, electrochemistry, polarography, electrochemical impedance spectroscopy (EIS), surface plasmon resonance (SPR), fast atom bombardment spectroscopy (FABS), matrix-assisted laser desorption ionization mass spectrometry (MALDI/MS), inductively coupled plasma mass spectroscopy (ICP/MS), Raman spectroscopy (RS), FTIR, SAW spectroscopy, surface-enhanced Raman spectroscopy (SERS), laser induced breakdown spectroscopy (LIBS), spark-induced breakdown spectroscopy (SIBS), lateral flow chromatography, NMR, QR (quadrupole resonance), and so forth. Detection systems are optionally qualitative, quantitative or semi-quantitative.

Of particular interest for detection of explosives are electron capture (often combined with gas chromatography), ion mobility spectroscopy, mass spectroscopy, and chemiluminescence (often combined with gas chromatography).

One common analytical instrument for detection of nitrate-type explosives relies on pyrolysis followed by redox (electron capture) detection of $NO_2$ groups (Scientrex EVD 3000), but is prone to false alarms. So too is chemiluminescence. Also of interest is differential mobility spectroscopy as described in U.S. Pat. No. 7,605,367 to Miller. Ion mobility spectroscopic (IMS) detectors are in widespread use and typically have microgram or picogram sensitivity. IMS requires ionization of the sample, which is typically accomplished by a radioactive source such as Nickel-63 or Americium-241. This technology is found in most commercially available explosive detectors like the GE VaporTracer (GESecurity, Bradenton, Fla.), Sabre 4000 (Smiths Detection, Herts, UK), Barringer IonScan™ 400, and Russian built models.

The luminescence of certain compounds undergoing reaction with electron-rich explosive vapors has been improved with the introduction of amplifying fluorescent polymers as described in U.S. Pat. No. 7,208,122 to Swager (ICx Technologies, Arlington Va.). Typically, vapors are introduced into a tubular sensor lined with a conductive quenchable fluorescent polymer by suction. These sensors lack a preconcentrator and work only for analytes with electron-donating properties. More recent advances have extended work with fluorescent polymers to include boronic peroxide-induced fluorescence, as is useful for detecting certain classes of explosives.

FIDO® detects TNT and other explosives (J. S. Yang, and T. M. Swager, 1998. "Porous Shape Persistent Fluorescent Polymer Films: An Approach to TNT Sensory Materials." *Journal of the American Chemical Society,* 120, 5321-5322). It is approximately 1000 times more sensitive than most explosive detection systems currently used for passenger screening in airports. This sensitivity is achieved by using cooperatively fluorescent polymeric materials. In the absence of TNT, the polymers fluoresce (emit visible light) when exposed to light of the correct wavelength. When molecules of TNT are present, the intensity (brightness) of the fluorescence is quenched by a self-amplifying effect, and a sensitive photo detector then detects the drop in fluorescence intensity. At this time, the sensor detects TNT, 2- and 4-DNT, and other nitro aromatic compounds derived from TNT. In laboratory tests, the sensor has demonstrated lower limits of detection of one femtogram ($1\times10^{-15}$ grams) of TNT vapor. Fluorophoric polymers for detecting other hazardous or illicit materials may also be used. Publications related to coordinately quenched fluorophores for trace analyte detection are incorporated in full by reference.

An MEMs-based pre-concentrator (an adsorbent bed) has recently been integrated into the FIDO explosives vapor detector to increase the volumetric sampling rate of the system. This adsorbent matrix increased the volumetric sampling rate of fluorescence detection systems from 30 mL/min to in excess of 2 L/min by a modified batch process with thermal cycling of the adsorbent matrix. Adsorbent matrices are well known in the art, having been pioneered by Almirall. Contributions include U.S. Pat. Nos. 6,171,378 and 7,118,712 to Manginell and U.S. Pat. No. 7,713,421 to Galbraith, WIPO Doc. No. 2010/095123 to Langford and in US Pat. Appl. Doc. 2009/008421 to Almirall, for example. Literature on selection and use of sorbent materials for SPME and related preconcentration arts is widely available. A more detailed reading list includes E. J. Houser et al, 1999, Sorbent coatings for detection of explosives vapors: applications with chemical sensors, Proceedings of the SPIE, Orlando, Fla., 3710:394-401; Houser, E J et al, 1994, Linear and Hyperbranched Hydrogen Bond Acidic Poly(silylene methylene)s for Chemical Sensor Applications, PMSE Preprints 203, 88, 548, in R. A. McGill, M. H. Abraham, J. W. Grate, Choosing polymer coatings for chemical sensors," CHEMTECH 24, pp. 27-37; Houser E J et al. 2001. Rational materials design of sorbent coatings for explosives: applications with chemical sensors, Talanta 54:469-84; Pai R S et al, 2008, Sorbent Coatings and Processing Techniques for Trace Analysis of Hazardous Materials in Micro/Nano Sensors, IEEE University/Government/Industry Micro/Nano Symposium, 2008. UGIM 17th Biennial Volume, Issue 13-16:153-156; Voiculescu, I et al, 2006, Micropreconcentrator for Enhanced Trace Detection of Explosives and Chemical Agents, Sensors Journal, IEEE, Volume 6:1094-1104; U.S. Pat. No. 6,660,230; US Pat. Appls. 2005/0276726 and 2009/0084201, all of which are incorporated herein in full by reference.

Other analytical modalities are known in the art, and include the MDS Sciex CONDOR, Thermedics EGIS, Ion Track Instruments Model 97, the Sandia Microhound, Smith's Detection Cyranose, FIDO® (FLIR Systems, Arlington Va., formerly ICx Technologies), Gelperin's e-nose (U.S. Pat. No. 5,675,070), Implant Sciences' Quantum Sniffer, and others. However, these technologies are associated with aspiration and analysis of free vapors without concentration, which are typically in vanishingly small concentrations, either because a) the vapor pressure of the material is inherently small, or b) if vapor pressure is larger, then significant quantities of a more volatile analyte will have been lost due to ageing of the material prior to sampling. Also a detriment, some of these detectors have had maintenance issues related to fouling or poisoning of the adsorbent or detector due to aspiration of particles. Thus the system of the invention offers a clearcut advance in the art, permitting the separation of vapors from a moving gas stream without filtration or adsorption onto a solid phase bed and thus permitting continuous analysis when coupled to a suitable detection platform. Semi-continuous and batch type processes are also flexibly accommodated by the hot trapped vortex vapor concentrators of the invention. Publications related to these processes are incorporated in full by reference.

Conventional systems are described in U.S. Pat. Nos. 7,256,396, 7,260,483, and 6,972,408 and more recently in US Pat. 2010/0252731, where high vacuum is used (0.1 to 30 mTorr). Also of interest is the Aerodyne Aerosol Mass Spectrometer [Takegawa et al, 2005, "Characterization of an Aerodyne Aerosol Mass Spectrometer" Aersol Sci Tech 39:760-770; Bae et al, 2007, "Interference of organic signals in highly time resolved nitrate measurements by low mass resolution aerosol mass spectrometry. J Geophys Res 112: 1-16]. In this system, analyte vapors are released by laser ablation from a very well collimated particle beam (typically <0.25 mm diameter) and ionized in flight. The resulting vapors are conveyed in a buffer gas at high vacuum, typically with Einzel lensing, into a mass spectrometer. However, the detector can be badly damaged by the entry of intact particles that escape the laser. Moreover, the particle-by-particle approach and requirement for high vacuum substantially limits application for high throughput analysis. Publications related to these processes are incorporated in full by reference.

Related systems are described in PCT Publication WO/2008/049038 to Prather, U.S. Pat. No. 6,906,322 to Berggren, and U.S. Pat. No. 6,664,550 to Rader. These devices are readily overloaded when confronted with large amounts of complex mixtures, interferents, and dust, such as are likely to be encountered in routine use and hence have had limited applicability. Publications related to these processes are incorporated in full by reference.

Like FIDO, mass spectroscopy also offers the potential for miniaturized continuous flow detection and likely will continue to have an inherent capacity to simultaneously detect a broader range of possible target analytes. Conventionally, the inlet flow rate into an MS instrument is small (less than 1 mL/min). A common practice employed with detectors that can process limited sample volumes is to use a split flow into the detector that essentially purges most of the sample; this approach is undesirable since most of the sample volume is not analyzed.

Alternatively, an adsorbent matrix like that described above may be used to preconcentrate a trace vapor stream, with intermittent thermal cycling to release the adsorbed vapors. The adsorbent bed can be heated to desorption in approximately 100 ms, and because it has low thermal mass the chip cools back to ambient temperature in less than 5 s when a flow of air is drawn through the chip. Hence, the sampling duty cycle of the chip would be on the order of 8-10 s/cycle, which is compatible with a batch-sampling approach.

Cylindrical Ion Trap MS/MS

Very recently, exceptionally compact mass spectrometers utilizing cylindrical ion trap (CIT) technology have been developed at Purdue University and are being commercialized by ICx Technologies. This is a significant advancement in MS capability because it allows for continuous flow under conditions where ions are collected in an electrical field and may be released into the detector according to their mass/charge ratio without need for a chromatographic step. Complex target analyte fingerprints can be accumulated and matched with libraries of known substances.

Like traditional quadrupole ion traps with hyperbolic electrode geometries, the CIT utilizes a three-electrode structure comprising a ring and two end-cap electrodes to perform mass analysis. Ions generated in the manner described above are trapped between the electrodes by an oscillating electric field. Ions of a particular mass-to-charge ratio can be trapped within this field for an indefinite amount of time and may be released for analysis according to programmed instructions. Publications related to CIT are incorporated in full by reference.

Once ions are trapped in the CIT, they can be further manipulated for MS/MS. All ions of a particular mass-to-charge ratio oscillate at a very specific frequency given a set of experimental conditions. These ions can be further manipulated by applying a frequency in resonance with their oscillation frequency. This is typically done at an amplitude great enough to cause unwanted ions to be ejected or an amplitude just high enough to cause fragmentation of the ions. By ejecting ions that are either unwanted or may be interfering with the ions of interest, or by generating specific fragment ions, an analyte's identity can be confirmed with higher specificity.

By incorporating CIT technology into Griffin spectrophotometers, the vacuum requirements are also reduced and the power requirements minimized, thus achieving analytical performance and resolution equivalent to floor-sized quadrupole mass spectrometers.

The inventive vapor traps of the invention are conceived to interface with an MS/MS system for continuous operation at high throughput. An apparatus conforming to the teachings of the invention allows one, single, almost microscopic explosive particle to be collected, for example, and vapors released from the particle to be introduced into a mass spectrometer. By concentrating the vapors as described above, and by limiting intrusion of water vapor and interferent ions such as nitrous oxides by supplying dry make-up gas into the trapped vortex cavity during sampling, the final piece of a trace analyte detection system for high throughput operation seems to have fallen into place.

Furthermore, since this system can be configured with conveyer belts for delivering samples, jet-assisted sampling noses, proximity sensors, and other automation, it obviates the necessity for manual operation so that the steps of the entire process can be automated and are uninterrupted at high throughput. Furthermore, the lack of moving parts of the hot vortex cavity apparatus and MS/MS analytical package improves reliability and minimizes maintenance. Troublesome issues with adsorbent bed material selection and heating may be avoided. Using piezoelectric heads associated with the trapped vortex, unwanted ash and solids may be ejected from the cavity when they accumulate, and happily, sampling of the vapor concentrate may continue during the cleaning process. Waste particulates are discharged to exhaust and fouling of filters and adsorbent beds with ash and fiber is thus avoided.

Lower Limit of Detection

Referencing FIG. 6, the overall concentration factor that can be achieved with a fully functional system of the invention is dependent on the particle enrichment efficiency of the upstream air-to-air concentrator (601), the particle trapping efficiency of the inertial impactor (602), the volume of the cavity, and the sampling flow rate (604) to the detector (relative to the overall gas throughput).

However, of more meaningful interest for purposes of detection of explosives, for example, is the absolute lower limit of detection (LLOD). In the simplest case, such as a crystal of TNT, this is a function of particle size. Because the apparatus has a significant probability of capture of a 10 micrometer particle, and particle density is about 1.65 gm/cm$^3$, a single 10 micrometer particle having a mass of about 1 nanogram, which is above the threshold for the most sensitive IMS detectors, can be detected. A 100 micrometer particle having a mass of 1 microgram would likely be detected by even an unsophisticated detector.

As will be readily appreciated, a detector sensitivity of $10^{-15}$ (i.e., a femtogram), as in the case of the FIDO detectors, permits detection of a single particle having a 1 micron diameter (corresponding to a mass of about 1 picogram), and can potentially alarm on capture of a single particle of 0.2 microns diameter.

Detection threshold is of little or no importance if the substance of interest is a trace of vapor diluted in thousands of cubic meters of air, or is a tiny speck drifting downwind away from the suction intake. Mere detector sensitivity alone is insufficient to maximize detection success—first the target must be captured and presented to the detector.

Surprisingly, we have found that continuous capture and vaporization of particle-associated residues in a small volume as a vapor concentrate optimizes the value of detector sensitivity for continuous monitoring applications. In this case, the vapor concentrate is contained in the volume of the trapped vortex cavity, which may be 1 $cm^3$ or smaller.

Also, many substances have high boiling points and hence are associated with infinitesimally small free vapor concentrations. A much greater reliability of detection can be obtained by concentrating and sampling particles rather than free vapors. The lower limit of detection also applies to vapors adsorbed onto particles, but fortuitously, vapors are recognized to preferentially adhere to and concentrate on endogenous particles, so that particles normally resident in air actually serve to limit the free vapor concentration in air by scavenging vapors from it. It should be noted that 30 attomoles of a target substance MW 220 passively adsorbed to a dust mote, a fiber, or a skin cell will likely generate a vapor concentrate at the 1 femtogram threshold for detection by cooperative fluorescence quenching and may be detected in real time by the apparatus of the invention in a gas stream moving at hundreds or thousands of liters per minute.

Thus the technical advance of the inventive system is made clear. By having the capacity to sort particles out of the air and to selectively present the particle-associated vapors in a concentrated low flow volume stream to a detector, the utilization of highly sensitive detection systems becomes possible on a continuous flow basis. The system operates with negligible pressure drop, so that energy requirements are minimal, and can be scaled to meet almost any requirements. Semi-continuous and batch flow conditions may also be used, but the system is not limited thereto.

As would be known to one skilled in the art, particles may contain multiple volatile constituents, some of which are nitrogenous, others not. Thus a sampling system that can be interfaced with a mass spectrometer has the capacity to analyze a complex signature of volatile constituents at high resolution, including binders, plasticizers and solvents that are characteristic of targets of interest such as commercial explosives. This capacity is useful in increasing the reliability of the detection event and can even enable indirect detection of very low vapor pressure compounds by detection of companion molecules commonly associated with the substance of interest or likely to be detected on persons or luggage having been in proximity to explosives, for example.

Applications include roving surveillance with hand held "sniffers," stationary high throughput portals for screening passengers, automated sampling systems for use with belt-driven luggage handling systems, drive-through vehicle inspection stations, while not limited thereto.

INCORPORATION BY REFERENCE

All of the U.S. patents, U.S. patent application publications, U.S. patent applications, foreign patents, foreign patent applications and non-patent publications referred to in this specification and related filings are incorporated herein by reference in their entirety.

While the above is a complete description of selected embodiments of the present invention, it is possible to practice the invention using various alternatives, modifications, combinations and equivalents. In general, in the following claims, the terms used in the written description should not be construed to limit the claims to specific embodiments described herein for illustration, but should be construed to include all possible embodiments, both specific and generic, along with the full scope of equivalents to which such claims are entitled. Accordingly, the claims are not limited by the disclosure.

What is claimed is as follows:

1. An apparatus for selectively separating a volatile constituent of particles from a flowing gas stream for analysis, which comprises a housing with an inlet flow duct opening from an intake port that receives the gas stream at an upstream end at a first flow rate as driven by a pressure differential applied to said gas stream, said inlet flow duct with an enclosing wall therearound, and an outlet flow duct having an exhaust port at a downstream end for exhausting said gas stream therefrom;

a trapped vortex cavity communicating with and adjoining said inlet flow duct, wherein said trapped vortex cavity is bounded by superior, lateral, inferior, and posterior, surfaces, and an anterior opening to said inlet flow duct, said inferior surface extending longer toward said inlet flow duct than said superior surface;

said inferior surface of said cavity defines an upstream-facing step with diverter lip that extends toward flow lines of said gas stream when said gas stream flows through said inlet flow duct, partially constricting the flowing gas stream, and defining an inertial particle impactor face, such that said particles in said flowing gas stream impact against said upstream-facing step, and wherein said superior surface of said cavity defines a downstream-facing step that terminates at a junction flush with said inlet flow duct;

said diverter lip extending beyond said downstream facing step toward said gas stream flow lines, whereby a trapped vortex of said gas is created in said vortex cavity when said gas is flowing through said inlet flow duct and said outlet flow duct;

a sampling outlet defined through an internal surface of said trapped vortex cavity, wherein said outlet is enabled for aspirating and collecting a gas sample volume from said cavity at a second flow rate, said second flow rate having fractional value of said first flow rate.

2. The apparatus of claim 1, wherein said enclosing wall of said inlet flow duct is contoured to direct particles against said inertial particle impactor face.

3. The apparatus of claim 1, further comprising a heater for heating a portion of the trapped vortex cavity surfaces to a higher temperature to promote vaporization or sublimation of the collected sample, whereby said-volatile constituents is trapped as a vapor concentrate in said trapped vortex cavity until aspirated through said sampling outlet.

4. The apparatus of claim 3, wherein said heater comprises a resistive heating element that is thermally coupled to said portion of said trapped vortex cavity surfaces.

5. The apparatus of claim 3, wherein an infrared diode is mounted in said cavity.

6. The apparatus of claim 3, wherein one of said surfaces of said cavity is lined with a magnetically susceptible layer that is configured to be inductively heated.

7. The apparatus of claim 3, wherein said heater is a flash heater that is thermally coupled to one of said surfaces of said cavity.

8. The apparatus of claim 3, wherein said heater is used to continuously heat one of said surfaces of said cavity.

9. The apparatus of claim 1, further comprising a first pump or blower for applying said pressure differential to said gas.

10. The apparatus of claim 3, further comprising a second pump or blower for aspirating said gas sample volume from said cavity at a low volume flow rate.

11. The apparatus of claim 10, wherein said second pump or blower is operated continuously for continuous aspiration of said vapor concentrate.

12. The apparatus of claim 1, wherein said cavity and said inertial surface thereof are comprised of a thermally conductive material and said enclosing wall of said inlet flow duct are composed of a thermally insulative material.

13. The apparatus of claim 12, wherein said thermally insulative material is a ceramic or a glass and said thermally conductive material is a metal.

14. The apparatus of claim 1, further comprising a low volume flow source for supplying a make-up gas volume to said trapped vortex cavity, wherein said make-up gas volumetric flow rate is equal to or less than the gas sample volumetric flow rate aspirated from the cavity.

15. The apparatus of claim 14, wherein the low volume flow source is comprised of a dry gas.

16. The apparatus of claim 15, wherein the dry gas is argon.

17. The apparatus of claim 1, further comprising an air-to-air aerosol concentrator operatively joined to said inlet flow duct upstream of said trapped vortex cavity.

18. The apparatus of claim 1, further comprising a directional nose having at least one pulsed jet disposed thereon, said pulsed jet for dislodging a particle from a surface into the flowing gas stream.

19. The apparatus of claim 1, wherein said upstream-facing step is contoured for non-turbulently separating a critical streamline layer of the gas flow from a boundary streamline layer of heated trapped vortex flow such that said particles cross the boundary streamline layer, but a resident gas volume and heat of gas flowing in a vortex within said cavity is essentially isolated from the flowing gas stream.

20. The apparatus of claim 19, wherein said upstream-facing step is contoured at said diverter lip for non-turbulently separating a critical streamline layer of the gas flow from a boundary streamline layer of said heated trapped vortex flow such that said particles cross the boundary streamline layer, but said resident gas volume and heat of gas flowing in said vortex within said cavity is essentially isolated from the flowing gas stream.

* * * * *